(12) United States Patent
Kawasaki

(10) Patent No.: US 7,877,814 B2
(45) Date of Patent: Jan. 25, 2011

(54) CONTENT TRANSFERRING APPARATUS, CONTENT TRANSFERRING METHOD, AND COMPUTER PROGRAM

(75) Inventor: Makoto Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1121 days.

(21) Appl. No.: 11/139,519

(22) Filed: May 31, 2005

(65) Prior Publication Data

US 2005/0281185 A1     Dec. 22, 2005

(30) Foreign Application Priority Data

Jun. 22, 2004   (JP) .............................. 2004-183777

(51) Int. Cl.
  G06F 7/04     (2006.01)
  G06F 17/30    (2006.01)
  H04N 7/16     (2006.01)
(52) U.S. Cl. .......................................... 726/30; 700/94
(58) Field of Classification Search .................... 726/30
  See application file for complete search history.

(56) References Cited

U.S. PATENT DOCUMENTS

| | | | | |
|---|---|---|---|---|
| 5,337,044 A | * | 8/1994 | Folger et al. | 340/7.1 |
| 5,627,967 A | * | 5/1997 | Dauerer et al. | 726/2 |
| 5,758,355 A | * | 5/1998 | Buchanan | 1/1 |
| 5,991,810 A | * | 11/1999 | Shapiro et al. | 709/229 |
| 6,202,207 B1 | * | 3/2001 | Donohue | 717/173 |
| 6,496,692 B1 | * | 12/2002 | Shanahan | 455/418 |
| 6,553,375 B1 | * | 4/2003 | Huang et al. | 1/1 |
| 6,944,859 B2 | * | 9/2005 | Bunger | 717/178 |
| 7,430,425 B2 | * | 9/2008 | Knotts | 455/466 |
| 2002/0116082 A1 | * | 8/2002 | Gudorf | 700/94 |
| 2004/0006607 A1 | | 1/2004 | Kanada et al. | |

FOREIGN PATENT DOCUMENTS

| | | |
|---|---|---|
| EP | 1 530 113 A1 | 5/2005 |
| JP | 2000-305837 | 11/2000 |
| JP | 2001-155069 | 6/2001 |
| JP | 2002-132457 | 5/2002 |
| JP | 2002-260004 | 9/2002 |
| JP | 2003-018539 | 1/2003 |
| JP | 2003-029769 | 1/2003 |
| JP | 2003-337585 | 11/2003 |
| JP | 2003-339000 | 11/2003 |
| WO | WO 03/036541 A1 | 5/2003 |
| WO | WO 03/088664 A1 | 10/2003 |

* cited by examiner

*Primary Examiner*—Kambiz Zand
*Assistant Examiner*—Dant B Shaifer Harriman
(74) *Attorney, Agent, or Firm*—Oblon, Spivak, McClelland, Maier & Neustadt, L.L.P.

(57) ABSTRACT

A content transferring apparatus is disclosed which includes: a source ID list reception unit for receiving a source ID list from a content reproducing apparatus capable of reproducing contents furnished with source IDs included in the source ID list; a first extraction unit for extracting from either one or a plurality of transfer-destined contents a content furnished with a source ID included in the source ID list; and a content transmission unit for transmitting the content extracted by the first extraction unit to the content reproducing apparatus.

21 Claims, 16 Drawing Sheets

FIG. 6

| RECORD ID 302 | TYPE 304 | TITLE 306 | CODEC 308 | FILE NAME 310 | CONTENT ID 312 | SOURCE ID 314 | 252 |
|---|---|---|---|---|---|---|---|
| 1 | PACKAGE | ALBUM A | | | | | ..... |
| 2 | CONTENT | TRACK 1 | ATRAC3plus | C:¥Album-A¥Track1.oma | 010F501 | C122C7E | ..... |
| 3 | RENDITION | | ATRAC3plus | C:¥Album-A¥Track1.oma | 010F501 | C122C7E | ..... |
| 4 | RENDITION | | ATRAC3 | C:¥Album-A¥Track1-2.oma | 010F501 | C122C7E | ..... |
| 5 | RENDITION | | MPEG1 Audio Layer3 | C:¥Album-A¥Track1.mp3 | | | ..... |
| 6 | CONTENT | TRACK 2 | MPEG1 Audio Layer3 | C:¥Album-A¥Track2.mp3 | | | ..... |
| 7 | RENDITION | | MPEG1 Audio Layer3 | C:¥Album-A¥Track2.mp3 | | | ..... |
| ..... | ..... | ..... | ..... | ..... | ..... | ..... | ..... |

| RELATIONAL ID (322) | PARENT ID (324) | CHILD ID (326) |
|---|---|---|
| 1 | 1 | 2 |
| 2 | 1 | 5 |
| 3 | 2 | 3 |
| 4 | 2 | 4 |
| 5 | 2 | 5 |
| 6 | 6 | 7 |
| ⋮ | ⋮ | ⋮ |

FIG.13A

ALBUM WITH ALL OF ITS CONTENTS
TRANSFERRED BUT NOT REPRODUCIBLE 402, 316, 318

| ID | ··· | CONTENT ID | SOURCE ID | OWNED | PLAY |
|---|---|---|---|---|---|
| 30 | ··· | ··· | ··· | 0 | 0 |
| 31 | ··· | ··· | ··· | 0 | 0 |
| 32 | ··· | ··· | ··· | 0 | 0 |
| 33 | ··· | ··· | ··· | 0 | 0 |
| 34 | ··· | ··· | ··· | 0 | 0 |
| 35 | ··· | ··· | ··· | 0 | 0 |

FIG.13B

ALBUM WITH ALL OF ITS CONTENTS TRANSFERRED

404

| ID | ··· | CONTENT ID | SOURCE ID | OWNED | PLAY |
|---|---|---|---|---|---|
| 2 | ··· | ··· | ··· | 1 | 1 |
| 3 | ··· | ··· | ··· | 1 | 1 |
| 4 | ··· | ··· | ··· | 1 | 1 |
| 5 | ··· | ··· | ··· | 1 | 1 |
| 6 | ··· | ··· | ··· | 1 | 1 |
| 7 | ··· | ··· | ··· | 1 | 1 |

FIG.13C

ALBUM THAT INCLUDES TRANSFERABLE CONTENTS

406

| ID | ··· | CONTENT ID | SOURCE ID | OWNED | PLAY |
|---|---|---|---|---|---|
| 10 | ··· | ··· | ··· | 1 | 1 |
| 11 | ··· | ··· | ··· | 1 | 1 |
| 12 | ··· | ··· | ··· | 1 | 1 |
| 13 | ··· | ··· | ··· | 1 | 1 |
| 14 | ··· | ··· | ··· | 0 | 1 |
| 15 | ··· | ··· | ··· | 0 | 1 |

CONTENT TRANSFERRING APPARATUS, CONTENT TRANSFERRING METHOD, AND COMPUTER PROGRAM

CROSS REFERENCE TO RELATED APPLICATION

The present invention contains subject matter related to Japanese Patent Application No. JP 2004-183777 filed in the Japanese Patent Office on Jun. 22, 2004, the entire contents of which being incorporated herein by reference.

BACKGROUND OF THE INVENTION

The present invention relates to a content transferring apparatus, a content transferring method, and a computer program.

In recent years, information processing apparatuses such as PCs and portable devices with mass storage capabilities including hard disk drives have come into general use. Many users keep and manage large quantities of contents such as music and image data in the storage means of their information processing apparatus. These kinds of data are typically retained as digital data in compressed format such as MP3 or ATRAC. The data may be controlled by cryptography process as needed.

Today, it is common practice for the user to download music contents from music distribution servers connected to a network, such as EMD (Electronic Music Distribution) servers, store the downloaded contents in the storage units of their PCs, and get the stored data transferred to their content reproduction devices such as portable devices (PD) whereby transferred contents are reproduced and enjoyed.

There are a number of so-called jukebox applications for managing and reproducing contents and for controlling data transfer to external equipment such as portable devices (PD). The typical jukebox applications include SonicStage (trademark), SonicStage Simple Burner (trademark), MGIQLIP (trademark), Windows Media Player (trademark), Real Player (trademark), and iTunes (trademark). Each of these application programs is capable of downloading EMD contents and transferring the downloaded music data from the storage units of PCs to devices or media connected to the PCs.

To transfer music data from the storage unit of a PC to a portable device or a medium connected to the PC requires first selecting the contents to be transferred.

Hard disk (HD) drives used illustratively as a storage unit of the PC are noted for their large storage capacities that have been rapidly implemented in recent years. Other storage capabilities available with portable devices (PD) have also progressed significantly in capacity. The advent of such mass storage media is popularizing the practice of extracting not one but a large number of tunes from their sources and transferring the extracted tunes between devices or between a device and media.

Illustratively, iTunes of Apple Computer, Inc., one of the above-mentioned jukebox applications, has a function called Auto-Synch that works in conjunction with iPod, a portable device (PD) marketed by the same company. This function works as follows: when music data is added anew to the content database (i.e., hard disk) of the PC as EMD contents downloaded from their sources or ripped from CDs, the contents held by the PC are compared with the music data in iPod. The tunes found on the hard disk of the PC but not contained in iPod are transferred to the portable device so that the music data between the two devices are synchronized. Auto-Sync thus makes it possible automatically to transfer music data from the hard disk (HD) of the PC to the portable device iPod. Descriptions of this feature are found illustratively at http://www.apple.co.jp/ipod/ (http://www.apple.com/ipod/) and at http://www.apple.co.jp/ipod/autosync.html (http://www.apple.com/ipod/autosync.html).

SUMMARY OF THE INVENTION

However, if contents are transferred from the storage unit of a PC to the content reproducing apparatus such as a portable device as outlined above, then the contents not allowed to be reproduced by the content reproducing apparatus under copyright will also be transferred to the apparatus for unauthorized reproduction.

The present invention has been made in view of the above circumstances and provides a content transferring apparatus, a content transferring method, and a computer program capable of transferring between devices only the contents allowed to be reproduced under copyright.

According to one embodiment of the present invention, there is provided a content transferring apparatus including: a source ID list reception unit for receiving a source ID list from a content reproducing apparatus capable of reproducing contents furnished with source IDs included in the source ID list; a first extraction unit for extracting from either one or a plurality of transfer-destined contents a content furnished with a source ID included in the source ID list; and a content transmission unit for transmitting the content extracted by the first extraction unit to the content reproducing apparatus.

In the content transferring apparatus as embodied above, a source ID list is received from the content reproducing apparatus by the source ID list reception unit. The contents furnished with source IDs included in the source ID list are extracted from transfer-destined contents by the first extraction unit. The extracted contents are transmitted to the content reproducing apparatus by the content transmission unit.

The source ID is an ID attached to each content for copyright management over contents. The content reproducing apparatus retains in its storage area a source ID list including one or a plurality of source IDs. When contents to be reproduced are furnished with source IDs and are subject to copyright management, the content reproducing apparatus can reproduce the contents provided that their source IDs are included in the source ID list held by the apparatus. If the source IDs attached to the contents of interest are not included in the source ID list of the content reproducing apparatus, the apparatus cannot reproduce the contents. It follows that when the content transferring apparatus extracts the contents furnished with the source IDs included in the source ID list received from the content reproducing apparatus, the content transferring apparatus can transmit only the contents that are allowed to be reproduced by the content reproducing apparatus under copyright.

In one preferred structure according to the invention, the content transferring apparatus may further include: a content ID list reception unit for receiving from the content reproducing apparatus a content ID list including content IDs attached to the contents held by the content reproducing apparatus; and a second extraction unit for extracting from either one or a plurality of transfer-destined contents a content furnished with a content ID not included in the content ID list; wherein the content transmission unit may transmit to the content reproducing apparatus the contents extracted by the first and the second extraction units. The content ID is an ID attached uniquely to each content. With this structure, the second extraction unit of the content transferring apparatus may extract the contents furnished with the content IDs not found in the content ID list that includes the content IDs attached to the contents owned by the content reproducing apparatus. That is, the second extraction unit may extract the contents not owned by the content reproducing apparatus. Thus only the contents extracted by the first and the second extraction units, i.e., contents not owned by the content reproducing apparatus and reproducible by that apparatus under copyright, can be transmitted to the apparatus.

In another preferred structure according to the invention, the first extraction unit may extract the contents furnished with source IDs included in the source ID list from the contents extracted by the second extraction unit.

In a further preferred structure according to the invention, the content transferring apparatus may further include a format conversion unit which, if the contents extracted by the first extraction unit are in a format not reproducible by the content reproducing apparatus to which the extracted contents have been transmitted, then converts the extracted contents into a format reproducible by the content reproducing apparatus; wherein the content transmission unit may transmit the newly formatted contents to the content reproducing apparatus. With this structure, the content transferring apparatus can transmit the contents to the content reproducing apparatus in a format immediately reproducible by that apparatus.

In an even further preferred structure according to the invention, the newly formatted contents may be stored into a content storage unit in association with the previously formatted contents. With this structure, the content transferring apparatus can retain both the newly formatted and the previously formatted contents in the content storage unit. When the content transferring apparatus later transmits the contents to the content reproducing apparatus, there is no need to again format the contents; the newly formatted contents held in the content storage unit need only be retrieved for transmission.

In a still further preferred structure according to the invention, the content transferring apparatus may further include: a content storage unit for storing a plurality of contents; and a transfer-destined content designation unit for designating either one or a plurality of contents as the transfer-destined contents from among the plurality of contents stored in the content storage unit.

In a yet further preferred structure according to the invention, the transfer-destined content designation unit may designate in a suitably timed manner all contents stored in the content storage unit as the transfer-destined contents. The timing for designating the contents may illustratively be when the content transferring apparatus detects connection of the content reproducing apparatus to the content transferring apparatus, when the user designates desired contents through a GUI display, or when a predetermined time of day is reached every week (e.g., at midnight every Monday). With this structure, the content transferring apparatus may extract, from all contents held in the content storage unit, those contents that can be reproduced by the content reproducing apparatus under copyright, and may transmit the contents. It is thus possible not only for the user to manually select desired contents for transmission but also for the content transferring apparatus to automatically transmit contents to the content reproducing apparatus. Upon such automatic transmission, only the contents reproducible by the content reproducing apparatus under copyright can be transmitted to that apparatus.

In another preferred structure according to the invention, the transfer-destined content designation unit may designate user-designated contents as the transfer-destined contents to be transferred from the content storage unit. With this structure, user-designated contents will not be transmitted if they are not allowed to be reproduced by the content reproducing apparatus under copyright.

In a further preferred structure according to the invention, the content transferring apparatus may further include a non-transferable content list display unit for displaying a non-transferable content list of the contents which are designated as the transfer-destined contents by the transfer-destined content designation unit and which have not been extracted by the first extraction unit. With this structure, the user can verify those of the user-designated contents which have not been transferred to the content reproducing apparatus.

In an even further preferred structure according to the invention, the content storage unit may store the plurality of contents in either one or a plurality of groups, the content transferring apparatus further including a transferable content list display unit for displaying a transferable content list of at least one of the groups including at least one content extracted by the first extraction unit.

In a still further preferred structure according to the invention, the content transferring apparatus may further include a transferable content list display unit for displaying a transferable content list of the contents extracted by the first extraction unit.

According to another embodiment of the present invention, there is provided a computer program to be read into a computer so that the computer executing the program will function as the above-described content transferring apparatus.

According to a further embodiment of the present invention, there is provided a content transferring method implemented through the use of the above-described content transferring apparatus.

As outlined above, the present invention provides a content transferring apparatus, a content transferring method, and a computer program for transferring to a content reproducing apparatus only the contents that are reproducible by the reproducing apparatus under copyright.

Other objects, features and advantages of the present invention will become more apparent in the following specification and accompanying drawings.

BRIEF DESCRIPTION OF THE DRAWINGS

FIG. 6 is an explanatory view showing a property table in a content management database used by the inventive system;

FIG. 7 is an explanatory view showing a parent-child relation table in the content management table;

FIGS. 13A through 13C are explanatory views showing typical records of contents included in transferable and non-transferable albums;

DETAILED DESCRIPTION OF THE PREFERRED EMBODIMENTS

Figure 1:
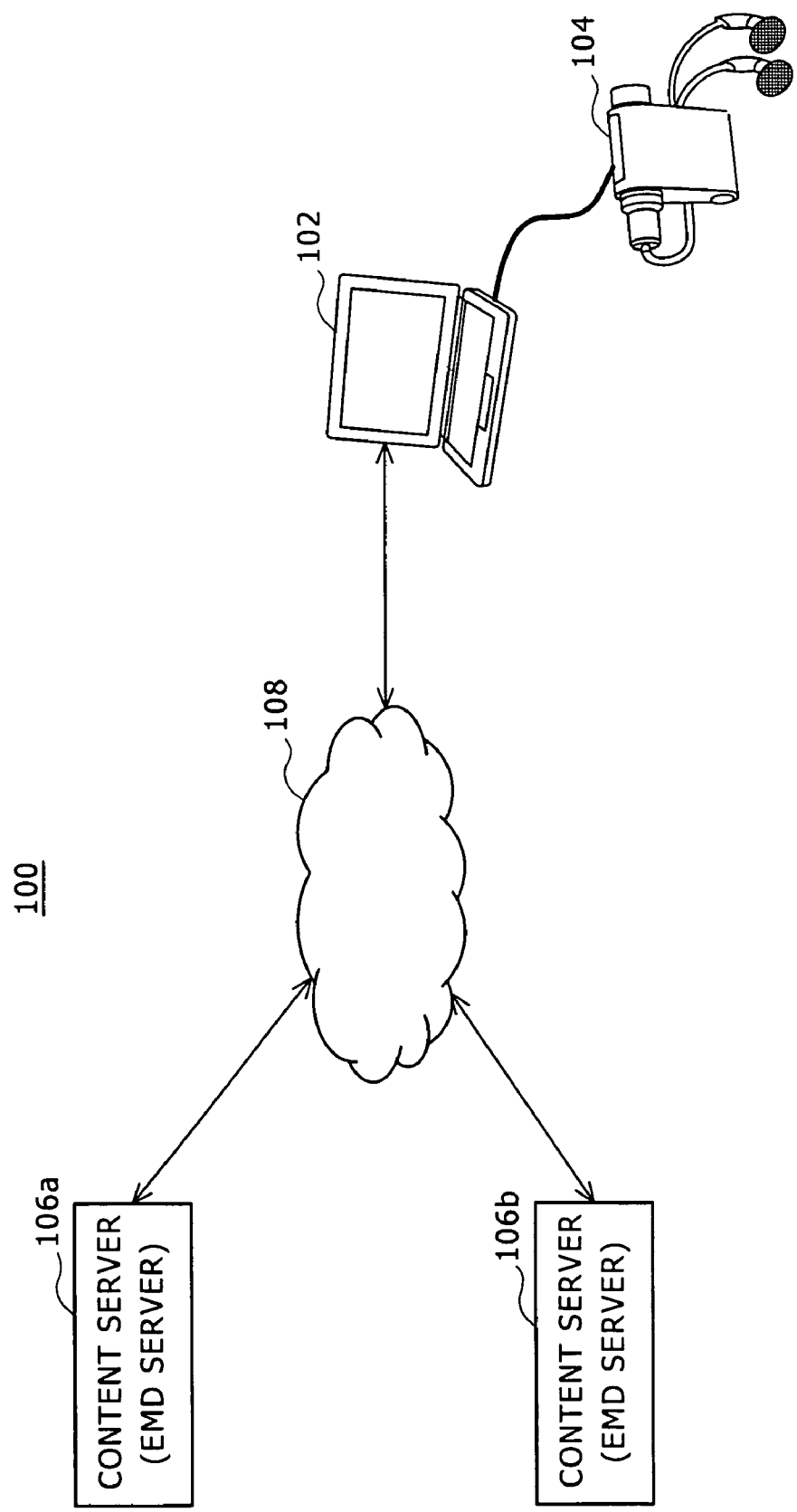
FIG. 1 is an explanatory view showing an overall configuration of a content transfer system according to the present invention.

Preferred embodiments of the present invention will now be described with reference to the accompanying drawings. In the ensuing specification and in the accompanying drawings, like reference numerals designate parts or components that are substantially the same in function, and their descriptions will be omitted where redundant.

The contents destined for transfer by an embodiment of the invention are explained first. These contents are of all kinds: audio contents such as music, lectures and radio programs; video contents made up of moving and still mages constituting movies, TV programs, video programs, photos and drawings; electronic books, games, and software. Content data is illustratively digital data making up the above-mentioned kinds of contents including video data, audio data, electronic book data, computerized game data, and software data. In the specification that follows, contents will be discussed illustratively in the form of music contents (MP3, etc.), particularly the tunes ripped or self-recorded by use of recording devices, and music contents distributed by content servers. However, these forms of contents are only examples and will not be limitative of the invention.

What follows is a description of a content transferring apparatus 102 for transferring music contents as an embodiment of the present invention. An overall configuration of a content transfer system 100 according to the invention will be explained first by referring to FIG. 1. The content transfer system 100 includes the content transferring apparatus 102, a content reproducing apparatus 104, content servers 106a and 106b, and a communication network 108.

The content transferring apparatus 102 is an information processing apparatus capable of transferring music contents (or simply called contents hereunder) to the content reproducing apparatus 104. The content transferring apparatus 102 acquires content data by downloading it from the content server 106a or 106b. Content data may alternatively be obtained by ripping it from CDs (compact disks) or other recording media. As other alternatives, the content transferring apparatus 102 may receive content data from another information processing apparatus having downloaded or ripped it, or may read it from CDs or other external recording media carrying such content data.

Having acquired content data as described, the content transferring apparatus 102 stores it into a content storage unit (to be described later). Information about the contents held in the content storage unit is managed by a content management database (to be discussed later). The content transferring apparatus 102 may include other functions such as a content reproduction function and a content recording function in addition to its content transfer function.

Illustratively, the content transferring apparatus 102 may be any one of such diverse devices as computer equipment (laptop or desk-top type) including personal computers (PC), PDAs (personal digital assistants), portable video player/recorders, portable audio player/recorders such as MP3 players and IC player/recorders, imaging devices including digital cameras and video recorders, home-use game machines, VTRs; CD, MD or DVD player/recorders; radio sets, mobile phones, PHSs, and home information appliances.

The content reproducing apparatus 104 is an information processing apparatus for having music contents transferred from the content transferring apparatus 102 and reproducing the transferred content data. Illustratively, the content reproducing apparatus 104 may be connected to the content transferring apparatus 102 in a locally wired manner using a USB (Universal Serial Bus) cable or a SCSI (Small Computer System Interface) cable. Alternatively, the two apparatuses may be connected wirelessly or via the communication network 108. The content reproducing apparatus 104 may be any one of such devices as portable devices (PD) for reproducing music contents, PCs, mobile phones, home information appliances, and various music players.

The content servers 106a, 106b, etc., (simply called the content server 106 hereunder) act as music distribution servers such as EMD (electronic music distribution) servers.

The communication network 108 is a network that connects the content server 106 with the content transferring apparatus 102 for two-way communication. The communication network 108 may be a wired or wireless network constituted illustratively by public networks such as the Internet, telephone line networks, or satellite communication networks; or by dedicated line networks including WAN, LAN, and IP-VAN.

The content transfer system 100 has been outlined above. Described below with reference to FIG. 2 is a typical method by which the content transfer system 100 of this invention manages the copyrights of contents.

The content transfer system 100 adopts a copyright managing method for managing contents per content data provider (more specifically, content data owner) or per device that stores content data. According to this method, the content reproducing apparatus 104 that has acquired content data (i.e., to which the content data has been transmitted) is allowed or not allowed to reproduce the data depending on the corresponding content data provider. More specifically, the reproduction of content data is controlled on the basis of a source ID assigned uniquely to each of the content data providers involved. This copyright managing method will be described below in more detail with reference to FIGS. 2 and 3.

Figure 2:
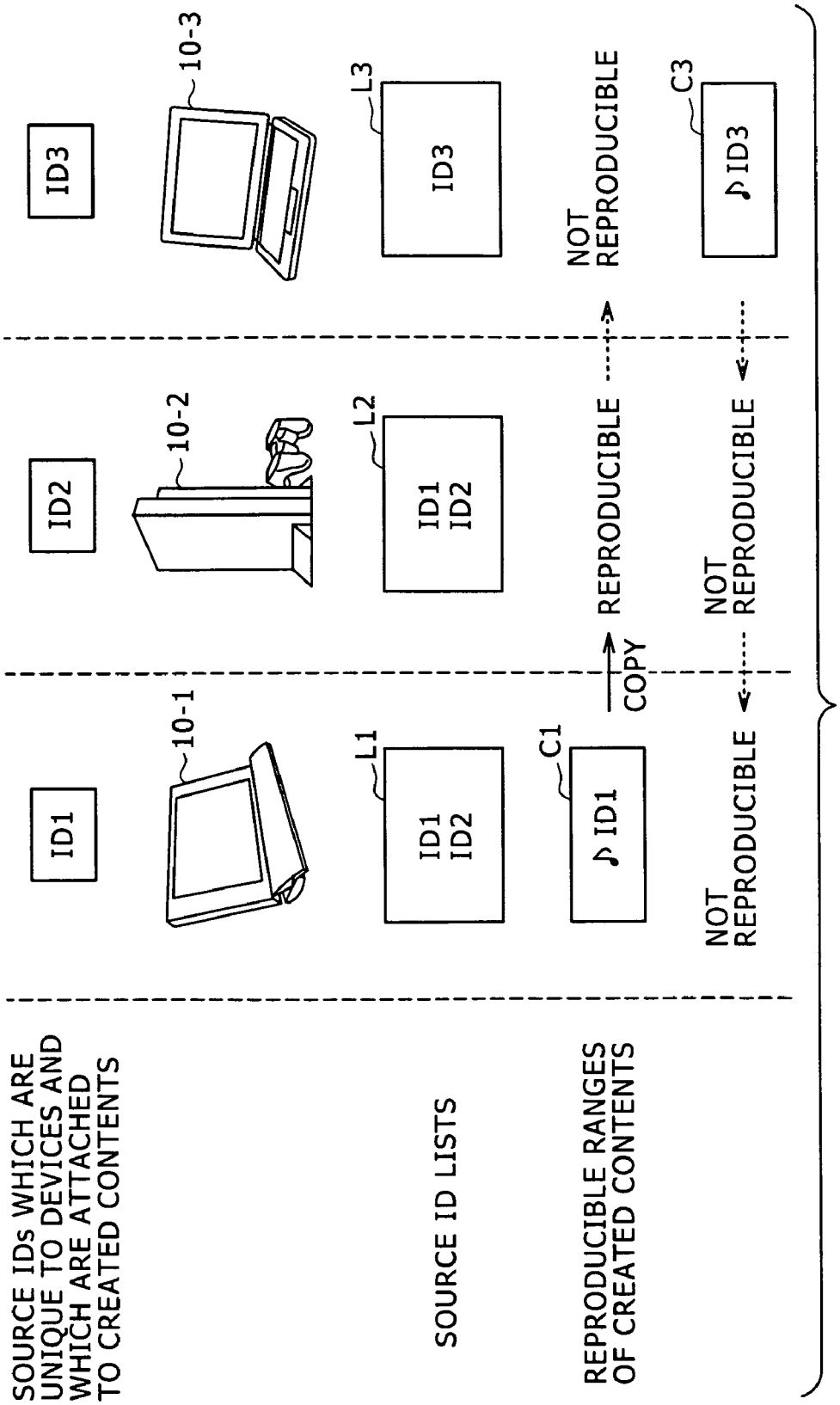
FIG. 2 is an explanatory view showing how copyright management is practiced by the inventive system.

FIG. 2 is an explanatory view showing how copyright management is practiced for reproduction control using source IDs. Content processing devices 10-1, 10-2 and 10-3 are shown here to record and reproduce content data. The devices 10-1, 10-2 and 10-3 are uniquely assigned a source ID1, a source ID2 and a source ID3 respectively. When contents are created anew by any of the devices 10-1, 10-2 and 10-3, the created contents are furnished with the corresponding source ID1, source ID2 or source ID3 before they are recorded.

The content processing devices 10-1, 10-2 and 10-3 have source ID lists L1, L2 and L3 respectively. The source ID list L1 for the content processing device 10-1 and the source ID list L2 for the content processing device 10-2 each include the source ID1 and source ID2 corresponding to the devices 10-1 and 10-2 respectively. On the other hand, the source ID list L3 for the content processing device 10-3 includes only the source ID3 corresponding to the device 10-3 itself and excludes the source ID1 and source ID2.

In the case above, the source ID1 is attached to content data C1 created by the content processing device 10-1. The content data C1 furnished with the source ID1 can be reproduced by the content processing device 10-2 because the source ID list L2 includes the source ID1. However, the content data C1 cannot be reproduced by the content processing device 10-3 because the source ID list L3 does not include the source ID1. Content data C3 created by the content processing device 10-3 and furnished with the source ID3 cannot be reproduced by the content processing device 10-1 or 10-2 because the source ID3 is not included in the source ID list L1 or L2.

Figure 3:
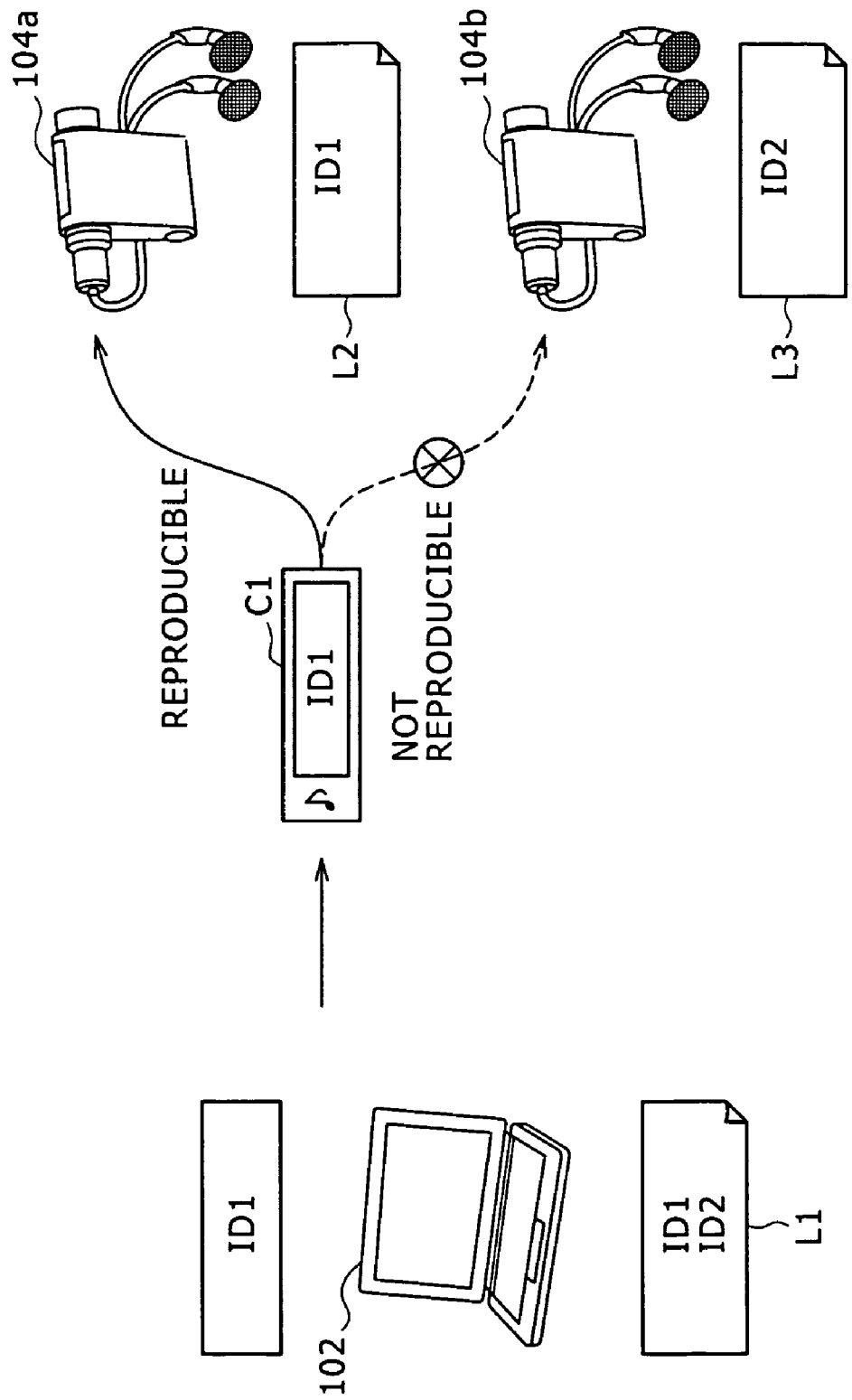
FIG. 3 is another explanatory view showing how copyright management is practiced by the inventive system.

How the copyright managing method above is adopted by the content transfer system 100 of this invention will now be described with reference to FIG. 3. The content transferring apparatus 102 is illustratively given ID1 as its unique source ID. The content data C1 recorded by the content transferring apparatus 102 is furnished with ID1 assigned to the apparatus 102 as the source ID. The content data recorded by the content transferring apparatus 102 illustratively includes content data downloaded by the content transferring apparatus 102 from the content server 106, content data ripped by the apparatus 102 from music CDs, and content data obtained by digitizing the analog music data recorded by the apparatus 102.

Alternatively, the content transferring apparatus 102 may acquire content data from another information processing apparatus having downloaded or ripped the data as mentioned above. Such content data is furnished with a source ID assigned to the other information processing apparatus that has performed the downloading or the ripping. Suppose now that content data is furnished with the source ID2. The content transferring apparatus 102, as shown in FIG. 3, retains the source ID list L1 including ID1 that is the source ID of the apparatus 102, and ID2 that is the source ID assigned to the other information processing apparatus. In this case, the content transferring apparatus 102 can reproduce both the content data furnished with the source ID1 and the content data provided with the source ID2 because the apparatus 102 has the source ID list including both the source ID1 and the source ID2.

A content reproducing apparatus 104a retains in its storage unit the source ID list L2 including the source ID1, and a content reproducing apparatus 104b holds a source ID list including the source ID2. Thus when the content transferring apparatus 102 transmits the content data C1 furnished with the source ID1 to the content reproducing apparatus 104a, the apparatus 104a can reproduce the content, data C1 because the source ID list L2 includes the source ID1. On the other hand, if the content transferring apparatus 102 transmits the content data C1 furnished with the same source ID1 to the content reproducing apparatus 104b, the apparatus 104b cannot reproduce the transferred content data C1 because the source ID list L3 does not include the source ID1.

When the content transferring apparatus 102 transfers the content data acquired from the other information processing apparatus to the content reproducing apparatus 104b, the apparatus 104b can reproduce the transferred content data because the source ID list L3 includes the source ID2. If the content transferring apparatus 102 transfers the content data acquired from the other information processing apparatus to the content reproducing apparatus 104a, the apparatus 104a cannot reproduce the transferred content data because the source ID list L2 does not include the source ID2.

The content transferring apparatus 102 is thus structured in such a manner as to transfer to the content reproducing apparatus 104 only the content data that can be reproduced by the apparatus 104. This kind of structure for the content transferring apparatus 102 will be discussed below.

The copyright managing method adopted by the inventive content transfer system 100 has been described above. What follows is a description of how the content transferring apparatus 102 of this invention is typically structured.

Figure 4:
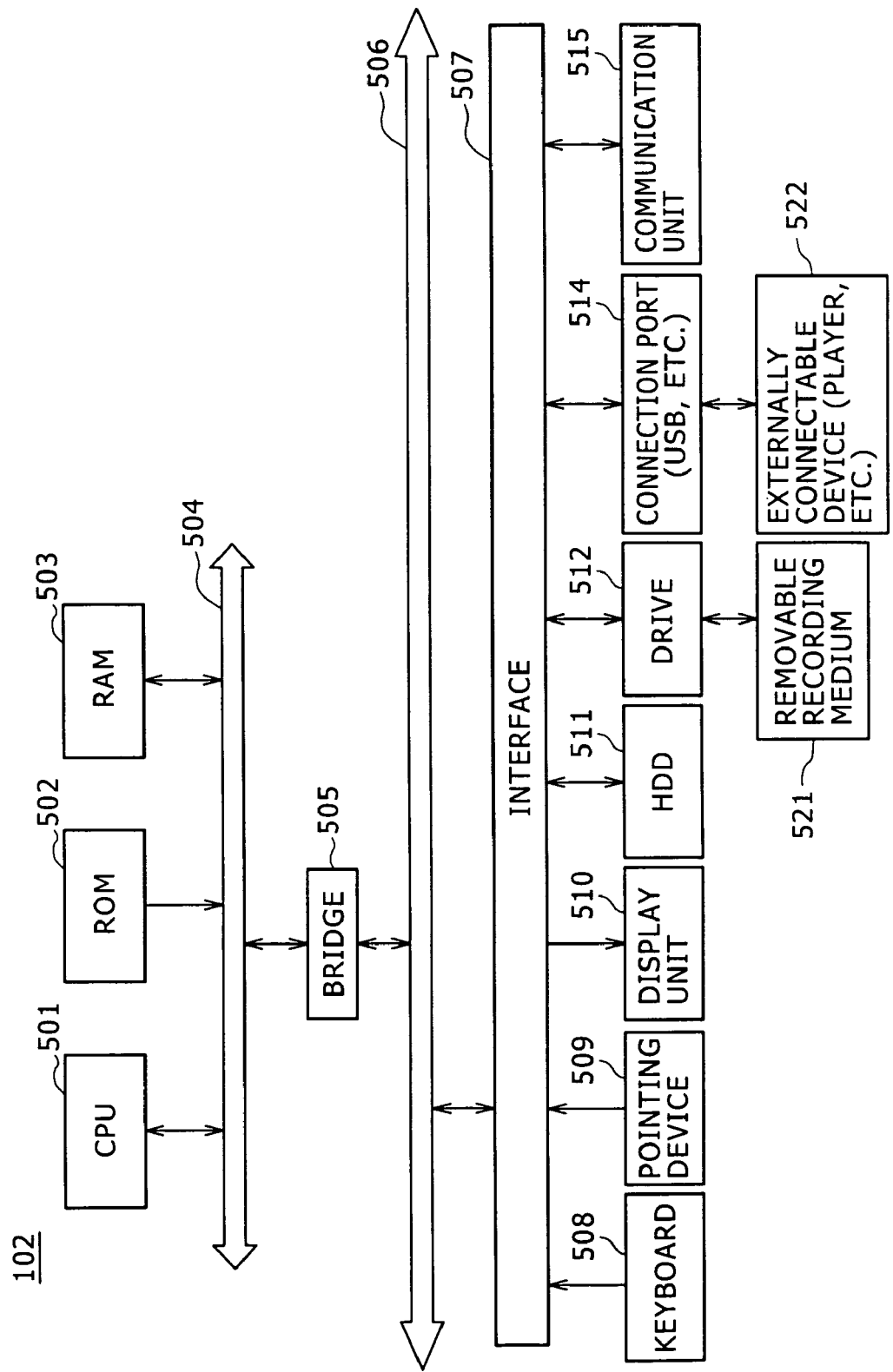
FIG. 4 is a block diagram showing a hardware structure of a content transferring apparatus as part of the inventive system.

The typical hardware structure of the content transferring apparatus 102 will now be described by referring to FIG. 4. A CPU (central processing unit) 501 is a control unit that carries out diverse processes in keeping with computer programs such as those for recording, reproducing, downloading or transferring contents under an operating system (OS).

A Non-Transitory ROM (read only memory) 502 retains programs and operation parameters for use by the CPU 501. A RAM (random access memory) 503 accommodates the programs used by the CPU 501 in executing its processing as well as parameters varied as needed when subjected to the process execution. These memories are interconnected by a host bus 504 constituted illustratively by a CPU bus.

The host bus 504 is connected via a bridge 505 to an external bus 506 such as a PCI (Peripheral Component Interconnect/Interface) bus.

A keyboard 508 is operated by a user inputting commands to the CPU 501. A pointing device 509 is operated by the user pointing to or selecting items on the screen of a display unit 510. The display unit 510 may be composed of a liquid crystal display (LCD) or cathode ray tube (CRT) displaying diverse kinds of information in texts or images. A hard disk drive (HDD) 511 drives its hard disks inside to record and reproduce the programs executed by the CPU 501 as well as information to be operated on by the latter.

A drive 512 is loaded with a removable recording medium 521 such as a magnetic disk, an optical disk, a magneto-optical disk, or a semiconductor memory. The drive 512 reads data or programs from the loaded recording medium 521 and supplies what has been read to the RAM 503 connected by way of an interface 507, external bus 506, bridge 505, and host bus 504.

A connection port 514 connects to an externally connectable device 522, such as a content reproducing apparatus 104, through the use of USB or IEEE1394 connective parts or the like. The connection port 514 is connected to the CPU 501 and other components via the interface 507, external bus 506, bridge 505, and host bus 504.

A communication unit 515 is connected to the communication network 108. In operation, the communication unit 515 carries out processes involved with the transmission of data coming from the CPU 501, HDD 511, etc., or with the reception of data coming from servers.

Figure 5:
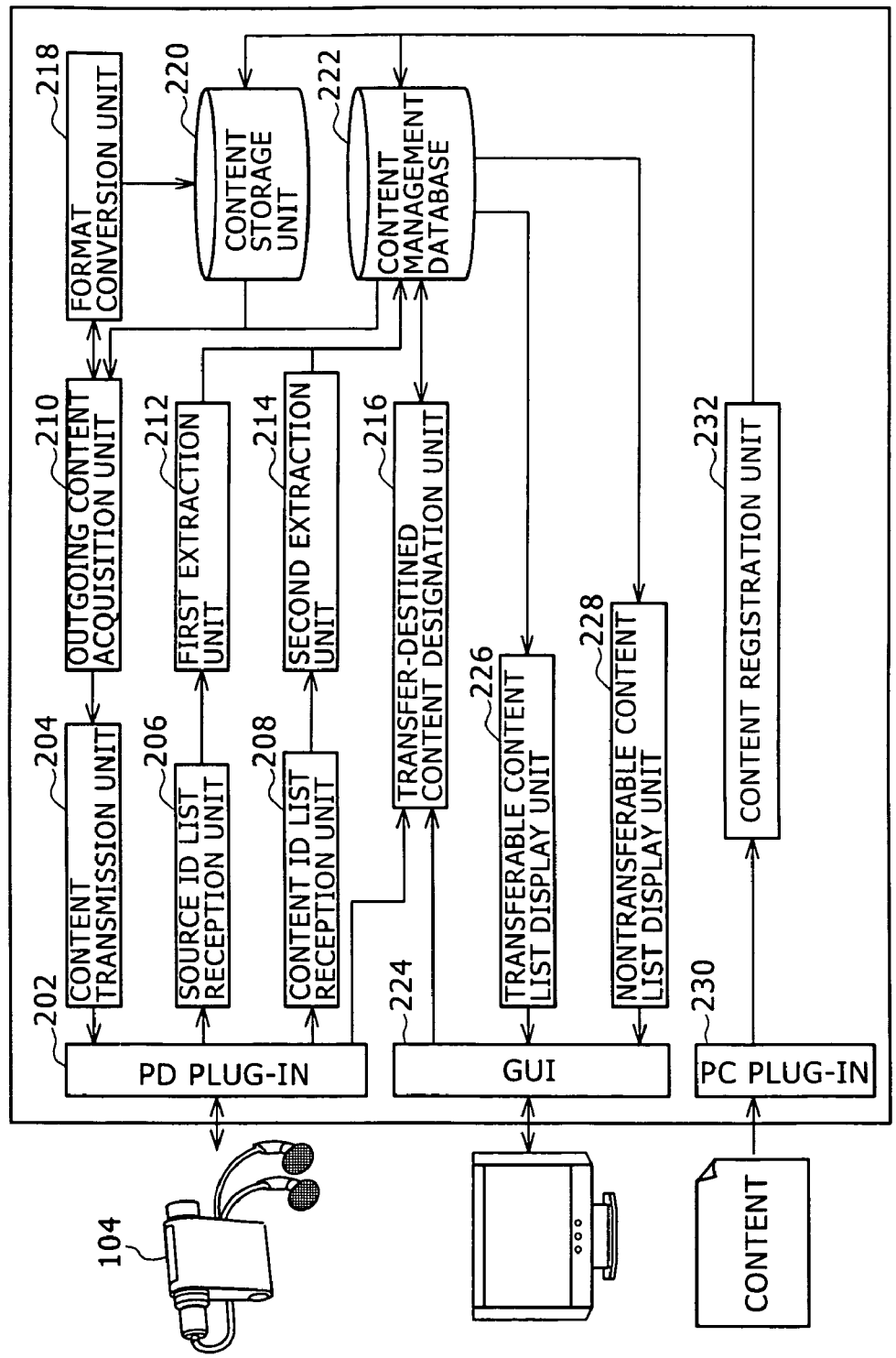
FIG. 5 is a block diagram showing a functional structure of the content transferring apparatus in the inventive system.

A functional structure of the content transferring apparatus 102 will now be described by referring to FIG. 5. The content transferring apparatus 102 illustratively includes a PD plug-in 202, a content transmission unit 204, an outgoing content acquisition unit 210, a format conversion unit 218, a source ID list reception unit 206, a content ID list reception unit 208, a first extraction unit 212, a second extraction unit 214, a content storage unit 220, a content management database 222, a GUI 224, a transfer-destined content designation unit 216, a transferable content list display unit 226, a nontransferable content list display unit 228, a PC plug-in 230, and a content registration unit 232.

The content registration unit 232 acquires content data through the PC plug-in 230 and stores the acquired data into the content storage unit 220. Furthermore, the content registration unit 232 is capable of registering in the content management database 222 information about the content data placed into the content storage unit 220, e.g., information representing file formats of the content data as well as file names (i.e., storage locations of the content data).

If the acquired content data is found carrying a content ID and a source ID, the content registration unit 232 acquires the attached content ID and source ID. The acquired content ID and source ID are registered in the content management database 222 as information about the content data.

The source ID is an ID assigned to each content data provider as mentioned above. The content ID is a unique ID attached to each content that is subject to copyright management.

If the content data acquired by the content registration unit 232 via the PC plug-in 230 is found carrying a content ID and a source ID, that means the content data has already been subjected to copyright management. Illustratively, such content data may have been ripped or downloaded by another information processing apparatus and then furnished with the source ID of that apparatus; or the content data may have been given a unique content ID by a copyright management server that provides overall copyright management.

If the content data acquired by the content registration unit 232 via the PC plug-in 230 is not furnished with a content ID and a source ID, that means the content data has yet to be subjected to copyright management. Illustratively, such content data may have been downloaded from free-of-charge websites. Alternatively, such ID-deprived content data may be content data to which the content transferring apparatus 102 attaches a content ID and a source ID in order to subject the data to copyright management. More specifically, such content data may have been acquired by the content transferring apparatus 102 having ripped or downloaded the data.

The content registration unit 232 is capable of adding a content ID and a source ID to content data which is subjected to copyright management. Specifically, when the content transferring apparatus 102 has downloaded content data from the content server 106 or has ripped the data from a music CD, the content registration unit 232 furnishes the content data in question with a source ID unique to the unit 232 as well as with a content ID. That content ID attached uniquely to the content data of interest is acquired illustratively by querying the copyright management server. The content registration unit 232 furnishes content data with its source ID and a content ID illustratively when the content data in question is acquired or when the content data is set to be transferred.

How the content management database 222 is structured will now be described with reference to FIGS. 6 and 7. The content management database 222 illustratively contains a property table 252 (FIG. 6) and a parent-child relation table 254 (FIG. 7). The property table 252 includes content-related information such as content data locations in the content storage unit 220 as well as grouping information about the content data. The parent-child relation table 254 defines the relations between the records making up the property table 252.

The property table 252 illustratively includes record ID fields 302, type fields 304, title fields 306, codec fields 308, file name fields 310, content ID fields 312, and source ID fields 314. The record IDs 302 are specific to the database.

Each type field 304 carries grouping information about content data. As shown in FIG. 3, there are three content data types: a package, a content, and a rendition. A package includes a plurality of contents. In other words, a plurality of contents are grouped into a single package. More specifically, as shown in the title fields 306, a plurality of music contents (tracks) are grouped into a single album.

A content is associated with a plurality of renditions. The content storage unit 220 may accommodate content data constituting one content in different file formats (MP3, WAV, etc.). A plurality of contents in the same file format corresponding to different codec types (e.g., ATRAC3Plus and ATRAC3) may also be stored in the content storage unit 220. A rendition represents a content data version of one content.

Figure 8:
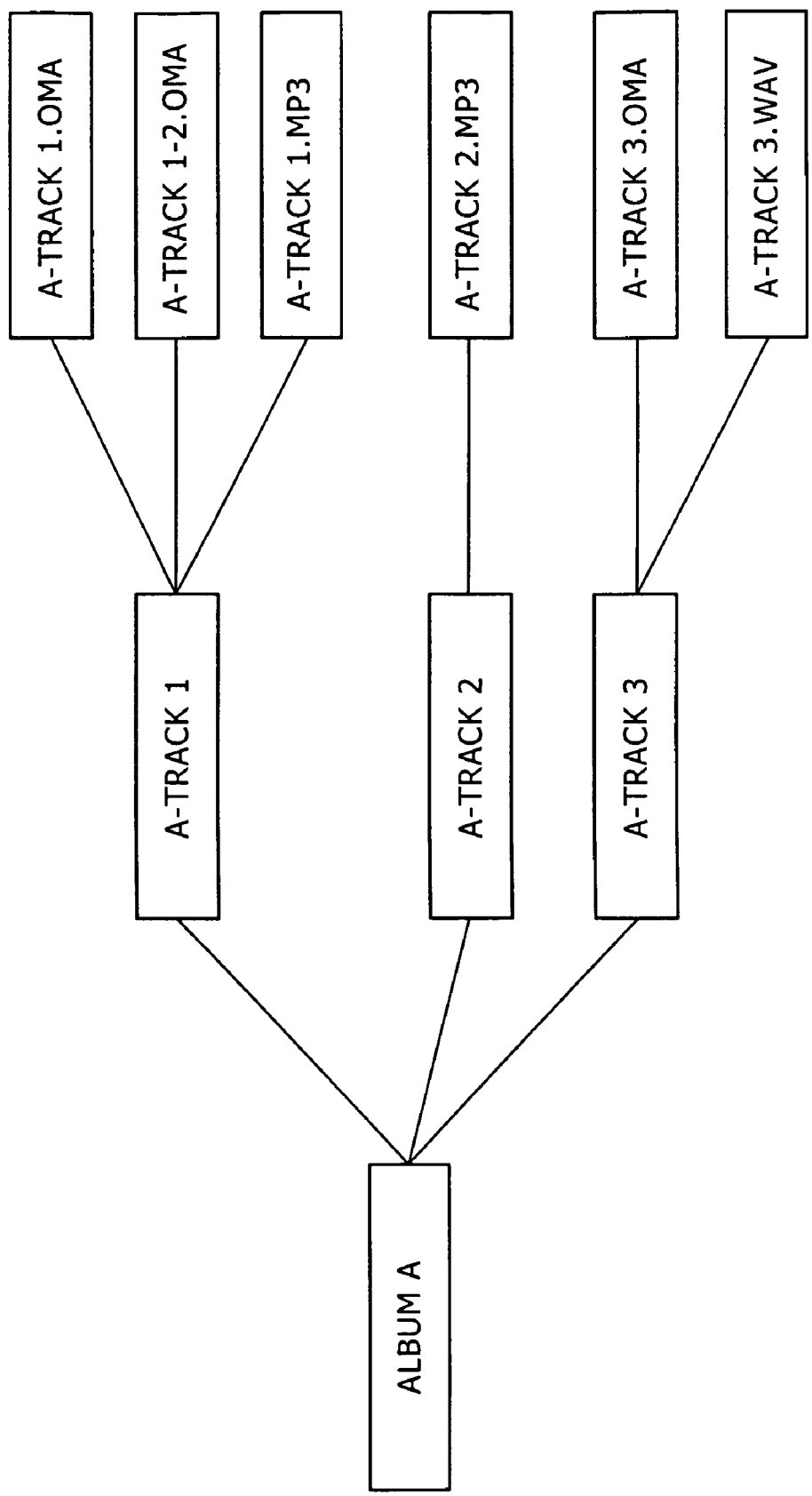
FIG. 8 is an explanatory view showing how contents are arranged into groups by the inventive system.

FIG. 8 is a simplified schematic view showing how content data is typically grouped. As illustrated, an album A (package) includes a plurality of tracks (contents). Each of the tracks includes a plurality of content data versions (renditions).

Each codec field 308 denotes codec software corresponding to the content data indicated by each rendition. For each record whose type field 304 is a content, either the codec corresponding to the original (i.e., as-acquired) content data or a "priority" codec is set. Each file name field 310 carries a name of the content data indicated by each rendition, the name being the data location of each content data version. Each record whose type field 304 is a content is given a file name representative of the original or "priority" data of the content in question, the file name being the original or priority data location of that content.

The priority data means newly converted content data that is transferred in preference to the original content data. Illustratively, suppose that the original content data is in MP3 format compatible with MPEG-1 Audio Layer-3 and that the same content is later converted by the format conversion unit, to be described later, into OpenMG format compatible with ATRAC3. In that case, the OpenMG-format content data compatible with ATRAC3, which is better suited for transfer to the content reproducing apparatus 104, is transferred to the apparatus 104 in preference to the original content data.

Each content ID field 312 carries a content ID attached to content data which is subject to copyright management. Different versions of content data (i.e., renditions) created out of one content are furnished with the same content ID as that given to the original content data. That is because the content data versions, although different in terms of format or codec type, still constitute the same content and thus should be subject to copyright management by use of the same content ID.

Each source ID field 314 carries a source ID attached to content data which is subject to copyright management. Different versions of content data (i.e., renditions) created out of one content are furnished with the same source ID as that attached to the original content data. Because the content data versions, different in terms of format or codec type, still constitute the same content, they should be subject to copyright management by use of the same source ID, as in the case of content IDs. Content data not subject to copyright management, such as data indicated by a record ID5, a record ID6 or a record ID7 in FIG. 6, will not be furnished with a content ID or a source ID.

The parent-child table 254 defines the relations between the record IDs constituting the property table. A parent ID field 324 and the corresponding child ID field 326 are filled with record IDs found in the property table, the record IDs indicating that a parent-child relation exists between the stored records. The parent-child relation signifies illustratively that if the parent is a package (album), then its children are contents (tracks) included in that package, and that if the parent is a content, then its children are renditions (content data) of that content.

Parent-child relations are described below in more detail with reference to FIGS. 6 and 7. Illustratively, suppose that it is desired to know which album carries content data "C:¥Album-A¥Track1-2.oma" managed with a record ID4 in the property table 252. In that case, reference is first made to the child ID fields 326 in the parent-child relation table 254. A search is made through the child IDs 326 for a record ID4. The record ID4 is found corresponding to a child ID4 associated with a relation ID4. Because the parent ID of the relation ID4 is 2, a record ID2 is referenced in the property table 252, which yields a track 1. Thus the content data "C:¥Album-A¥Track1-2.oma" is found corresponding to the content "track 1."

A search is then made through the parent-child relation table 254 for any relation ID field carrying the record ID2 in the corresponding child ID field 326. The record ID2 is found in the child ID field associated with a relation ID1. Because the parent ID of the relation ID1 has a record ID1, the record ID1 is referenced in the property table, which yields an album A. Thus the content data "C:¥Album-A¥Track1-2.oma" is found to be a tune included in the album A, following the references made to the property table 252 and parent-child relation table 254.

As another example, suppose that it is desired to know which codec type is associated with the content data which is held in the content storage unit 220 and which corresponds to the content "track 1" managed with the record ID2 in the property table 252. In this case, a search is made through the parent-child relation table 254 for any relation ID field carrying the record ID2 in the corresponding parent ID field 324. The search yields a relation ID3, a relation ID4, and a relation ID5. A reference to each of the child ID fields 326 reveals a record ID3, a record ID4 and a record ID5. Then referencing the record ID3, record ID4 and record ID5 for their codec fields 308 in the property table 252 discloses that three content data renditions associated with three codec types, ATRAC3Plus, ATRAC3, and MPEG-1 Audio Layer-3, are stored in the content storage unit 220.

The content management database 222 has been discussed above. Returning now to FIG. 5, the description of the functional structure of the content transferring apparatus 102 is continued below.

Content data is stored into the content storage unit 220 in the manner discussed above. The PD plug-in 202 detects the content reproducing apparatus 104 such as a portable device (PD) when the apparatus 104 is connected to the content transferring apparatus 102. Furthermore, the PD plug-in 202 is capable of transmitting and receiving various kinds of data such as content ID lists, source ID lists, and content data to and from the content reproducing apparatus 104.

The content ID list reception unit 208 has the ability to receive a content ID list via the PD plug-in 202 from the content reproducing apparatus 104 connected to the content transferring apparatus 102. The content ID list is a list of all content IDs attached to the content data owned by the content reproducing apparatus 102 in its storage unit. The content ID is a unique ID attached to each content. When the content ID list reception unit 208 acquires a content ID list from the content reproducing apparatus 104, the content transferring apparatus 102 can utilize the obtained content IDs to identify the content data already owned by the connected content reproducing apparatus 104.

The source ID list reception unit 206 is capable of receiving a source ID list via the PD plug-in 202 from the content reproducing apparatus 104 connected to the content transferring apparatus 102. The source ID list is a list of one or a plurality of source IDs kept by the content reproducing apparatus 102 in its storage unit. As mentioned above, the content reproducing apparatus 104 can reproduce the content data furnished with the source IDs included in the source ID list held by the apparatus 104 itself. When the source ID list reception unit 206 acquires a source ID list from the content reproducing apparatus 104, the content transferring apparatus 102 can utilize the obtained source IDs to identify the content data reproducible by the connected content reproducing apparatus 104.

The transfer-destined content designation unit 216 has the capability to designate one or a plurality of contents as transfer-destined contents from among a plurality of contents held in the content storage unit 220. More specifically, when the user designates desired contents through the GUI 224, the transfer-destined content designation unit 216 illustratively checks the titles of the designated contents to identify the record IDs associated with these titles in the title fields 306 of the property table 252. The transfer-destined content designation unit 216 then sends the identified record IDs to the first extraction unit 212 or second extraction unit 214, whereby the contents managed with these records are designated as transfer-destined contents.

The transfer-destined content designation unit 216 is also capable of designating all contents held in the content storage unit 220 as transfer-destined contents in a suitably timed manner. More specifically, the transfer-destined content designation unit 216 may consecutively read all content data in properly timed fashion from the content storage unit 220 and supply the retrieved content data to the first extraction unit 212 or second extraction unit 214 as transfer-destined contents. In practice, however, successively reading all content data can take an inordinately long time. That process is avoided by the embodiment having the transfer-destined content designation unit 216 to use the content management database 222 so as to designate transfer-destined contents. Illustratively, the transfer-destined content designation unit 216 acquires in a properly timed manner the record IDs of all records whose type fields 304 carry "content" in the property table 252 of the content management database 222. The record IDs thus obtained are sent to the first extraction unit 212 or second extraction unit 214, whereby the contents managed with these records are designated as transfer-destined contents.

The suitable timing above is such as when the PD plug-in 202 detects the connection of the content reproducing apparatus 104 to the content transferring apparatus 102, when a particular point in time designated by the user through the GUI 224 has been reached, or when a user-predetermined time of day is reached periodically (e.g., at midnight every Monday).

The second extraction unit 214 has the ability to acquire a content ID list from the content ID list reception unit 208 and to extract from transfer-destined contents those furnished with the content IDs not included in the obtained content ID list. The transfer-destined contents have been designated by the transfer-destined content designation unit 216 as discussed above. More specifically, given record IDs from the transfer-destined content designation unit 216, the second extraction unit 214 acquires the content IDs held in the content ID fields 312 corresponding to the record IDs in question in the property table 252 of the content management database 222. The second extraction unit 214 checks to determine whether the acquired content IDs are included in the content ID list. As a result of the check, the second extraction unit 214 extracts the record IDs corresponding to the content IDs not included in the content ID list.

It might happen that without recourse to the content management database 222, the transfer-destined content designation unit 216 successively reads content data from the content storage unit 220 and designates the retrieved data as transfer-destined content data. In such a case, the second extraction unit 214 may directly acquire the content IDs from the retrieved content data and check to determine whether the acquired content IDs are included in the content ID list. This also permits extraction of the content data in accordance with given conditions.

The first extraction unit 212 has the capability to acquire a source ID list from the source ID list reception unit 206 and to extract from transfer-designated contents those contents furnished with the source IDs included in the obtained content ID list. The transfer-destined contents have been designated by the transfer-destined content designation unit 216 as discussed above. More specifically, given record IDs from the transfer-destined content designation unit 216, the first extraction unit 212 acquires the source IDs held in the source ID fields 314 corresponding to the record IDs in question in the property table 252 of the content management database 222. The first extraction unit 212 checks to determine whether the acquired source IDs are included in the source ID list. As a result of the check, the first extraction unit 212 extracts the record IDs corresponding to the source IDs included in the source ID list.

It might also happen that without recourse to the content management database 222, the transfer-destined content designation unit 216 successively reads content data from the content storage unit 220 and designates the retrieved data as transfer-destined content data. In such a case, the first extraction unit 212 may directly acquire the source IDs from the retrieved content data and check to determine whether the acquired source IDs are included in the source ID list. This also permits extraction of the content data in accordance with given conditions.

If the contents yet to be owned by the content reproducing apparatus 104 and reproducible thereby are to be transferred thereto, the content transferring apparatus 102 may be required to select the content data which are furnished with the source IDs included in the source ID list and which are provided with the content IDs not included in the content ID list. The content data meeting these conditions is that which is extracted by both the first extraction unit 212 and the second extraction unit 214.

Alternatively, the first extraction unit 212 may perform its extraction process not on all contents designated as transfer-destined contents by the transfer-destined content designation unit 216 but only on the contents extracted by the second extraction unit 214. Conversely, the second extraction unit 214 may carry out its extraction process not on all contents designated as transfer-destined contents by the transfer-destined content designation unit 216 but only on the contents extracted by the first extraction unit 212.

The outgoing content acquisition unit 210 has the ability to acquire from the content storage unit 220 the content data extracted by both the first extraction unit 212 and the second extraction unit 214 and to provide the acquired content data to the content transmission unit 204. More specifically, the outgoing content acquisition unit 210 obtains the record IDs extracted by the first extraction unit 212 and second extraction unit 214, and AND's the acquired record IDs so as to obtain the record IDs extracted by both units. Alternatively, if the first extraction unit 212 carries out its extraction process only on the contents extracted by the second extraction unit 214 as described above, then the outgoing content acquisition unit 210 need only obtain the record IDs extracted by the first extraction unit 212. As another alternative, if the second extraction unit 214 executes its extraction process only on the contents extracted by the first extraction unit 212, the outgoing content acquisition unit 210 need only acquire the record IDs extracted by the second extraction unit 214.

After the outgoing content acquisition unit 210 acquires the record IDs extracted by both the first extraction unit 212 and the second extraction unit 214, the outgoing content acquisition unit 210 searches the property table 252 of the content management database 222 for the record IDs in question so as to acquire the codec types and file names of the records carrying these record IDs. Because each file name includes content data location information, the outgoing content acquisition unit 210 reads from the content storage unit 220 the content data in accordance with the acquired file names.

With the codec types and file names acquired, the outgoing content acquisition unit 210 checks to determine whether the content data retrieved from the content storage unit 220 based on the obtained file names is reproducible by the content reproducing apparatus 104 in terms of format and codec type. This check is carried out illustratively by acquiring device information including the content data formats and codec types compatible with the content reproducing apparatus 104 from the apparatus 104 via the PD plug-in 202, and by comparing the acquired device information with the formats (file names) and codec types obtained from the property table 252. Alternatively, the content transferring apparatus 102 may prompt the user to designate via the GUI 224 a format and a codec type for allowing the content data to be transferred to the content reproducing apparatus 104.

If it is revealed following the check above that the content data read from the content storage unit 220 in accordance with the file names is reproducible by the content reproducing apparatus 104 in terms of format and codec type, then the content data in question may be obtained from the content storage unit 220. If it is found that the content data read from the content storage unit 220 in accordance with the file names is not reproducible by the content reproducing apparatus 104 in terms of format or codec type, then the outgoing content acquisition unit 210 references the parent-table relation table 254 to find out whether the content data reproducible by the content reproducing apparatus 104 in terms of format and codec type is stored in the content storage unit 220. More specifically, the outgoing content acquisition unit 210 obtains the renditions associated with the content data of interest in the parent-child relation table 254 so as to determine whether the codec types and file names of the acquired renditions are suitable for reproduction by the content reproducing apparatus 104.

If the content data reproducible by the content reproducing apparatus 104 in terms of format and codec type is not found registered as renditions, i.e., not stored in the content storage unit 220, then the outgoing content acquisition unit 210 requests the format conversion unit 218 to create content data of an appropriate format and codec type. After the format conversion unit 218 carries out its format conversion process to create the content data of the suitable format and codec type, the outgoing content acquisition unit 210 transmits the created content data to the content transmission unit 204.

Given the request from the outgoing content acquisition unit 210, the format conversion unit 218 creates the content data of the suitable format and codec type required of contents. Illustratively, the format conversion unit 218 acquires from the outgoing content acquisition unit 210 the target content data to be converted in format as well as information for designating the target format and codec type. The format conversion unit 210 then converts the acquired content data into the designated format and codec type, and sends the converted content data to the outgoing content acquisition unit 210 while writing a copy of the content data to the content storage unit 220.

The content conversion unit 218 supplies the outgoing content acquisition unit 210 with information (e.g., file names) about the content data created and sent to the content storage unit 220. The outgoing content acquisition unit 210 additionally writes records of renditions and other information associated with the content data to the property table 252 of the content management database 222, before updating the parent-child relation table 254 correspondingly.

Alternatively, the format conversion unit 218 during the above process may write information about the content data it created to the tables in the content management database 222. As another alternative, the format conversion unit 218 may acquire not content data but record IDs from the outgoing content acquisition unit 210 and reference the tables in the content management database 222 based on the acquired record IDs, thereby obtaining the target content data to be converted in format from the content storage unit 220.

The content transmission unit 204 transmits the content data obtained from the outgoing content acquisition unit 210 to the content reproducing apparatus 104 via the PD plug-in 202. The content data sent from the content transmission unit 204 to the content reproducing apparatus 104 is content data which can be reproduced by the apparatus 104 under copyright following the extraction by the first extraction unit 212 and second extraction unit 214 and which has yet to be owned by the content reproducing apparatus 104. Furthermore, the content data is data which, having undergone the processing by the outgoing content acquisition unit 210 and format conversion unit 218, has become reproducible by the content reproducing apparatus 104 in terms of format and codec type.

The transferable content list display unit 226 displays a list of contents that are transferable from the content transferring apparatus 102 to the content reproducing apparatus 104. That is, the transferable content list display unit 226 displays a list of contents which can be reproduced by the content reproducing apparatus 104 but have yet to be owned thereby and which can be transferred from the content transferring apparatus 102 to the content reproducing apparatus 104.

More specifically, the transferable content list display unit 226 acquires from the outgoing content acquisition unit 210 those record IDs in the property table 252 of the contents extracted by both the first extraction unit 212 and the second extraction unit 214 from among transfer-destined contents. The transferable content list display unit 226 then obtains the titles (e.g., track 1, etc.) of the records corresponding to the acquired record IDs, and gets the acquired titles displayed on the content transferring apparatus 102 through the GUI 224.

Alternatively, the transferable content list display unit 226 may display groups including at least one transferable content. In such a case, the transferable content list display unit 226 acquires from the outgoing content acquisition unit 210 those record IDs in the property table 252 of the contents extracted by both the first extraction unit 212 and the second extraction unit 214 from among transfer-destined contents. With the record IDs acquired, the transferable content list display unit 226 references the parent-child relation table 254 to find the record IDs corresponding to the packages including the contents. The transferable content list display unit 226 then obtains the titles (e.g., album A, etc.) of the records corresponding to the acquired record IDs, and gets the acquired titles displayed on the content transferring apparatus 102 through the GUI 224.

Alternatively, the transferable content list display unit 226 may display a list of transferable contents or groups as described above and prompt the user to select from the displayed list a desired content or group for transfer to the content reproducing apparatus 104. In this case, the outgoing content acquisition unit 210 supplies the content transmission unit 204 with the content data constituting the content selected by the user from the list. As a result, only the content data desired by the user is transferred from the content transferring apparatus 102 to the content reproducing apparatus 104.

The nontransferable content list display unit 228 displays a list of contents which cannot be transferred by the content transferring apparatus 102 to the content reproducing apparatus 104 because the contents in question have not been selected by the first extraction unit 212 from among the contents designated as transfer-destined contents by the transfer-destined content designation unit 216. That is, the nontransferable content list display unit 228 displays a list of contents (e.g., titles) which have been designated as transfer-destined contents but which are found nontransferable because they cannot be reproduced by the content reproducing apparatus 104. In particular, if the transfer-destined content designation unit 216 designates as transfer-destined contents those contents designated by the user through the GUI 224, the nontransferable content list display unit 228 may display a nontransferable content list allowing the user to know that there are nontransferable contents among the user-designated contents.

The timing for the nontransferable content list display unit 228 to display the nontransferable content list may be before or after the transfer of contents to the content reproducing apparatus 104. That is, nontransferable contents may be displayed as such before their transfer, or those contents that have not been transferred may be indicated as nontransferable after other contents have been transferred.

The functional structure of the content transferring apparatus 102 has been discussed above. Described below with reference to FIGS. 9 through 17 are typical flows of content transfer processing carried out by the content transferring apparatus 102 embodying the invention. In the description that follows, references will be made to screen examples appearing on the display unit of the content transferring apparatus 102.

For the ensuing description, it is assumed that the content transferring apparatus 102 transfers to the content reproducing apparatus 104 only the content data subject to copyright management and that the content reproducing apparatus 104 retains only the content data subject to copyright management. It is also assumed that the content transferring apparatus 102 transfers contents only to the content reproducing apparatus 104 holding a source ID list including the source ID assigned to the apparatus 104 itself.

Figure 14:
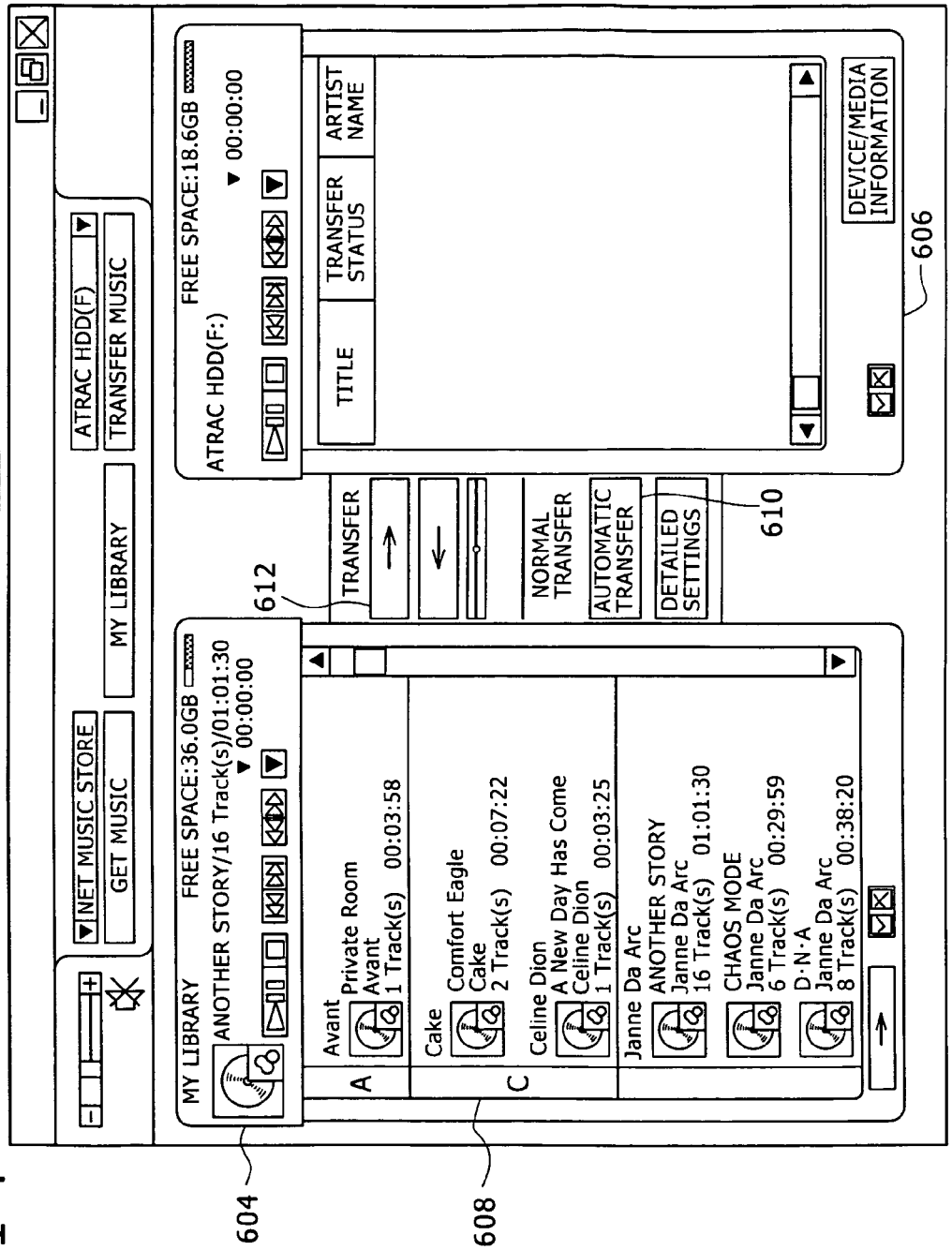
FIG. 14 is a schematic view of a screen layout showing an initial screen displayed on the content transferring apparatus in the inventive system.

Described first with reference to FIG. 14 is an initial screen 602 that appears on the display unit of the content transferring apparatus 102 prompting the user to make settings for the content transfer processing. For example, the initial screen 602 displays an album list 608, selected album information 604, and transfer destination device information 606. Illustratively, the user may select a desired album for transfer and press an arrow button 612 to transfer the contents included in the designated album to the connected device indicated by the device information 606. The user may also press an automatic transfer button 610 to display an automatic transfer setting screen 702 (to be described later) on which to set automatic content transfer. What follows is a description with reference to FIG. 9 of an automatic transfer process performed by the content transferring apparatus 102.

Figure 9:
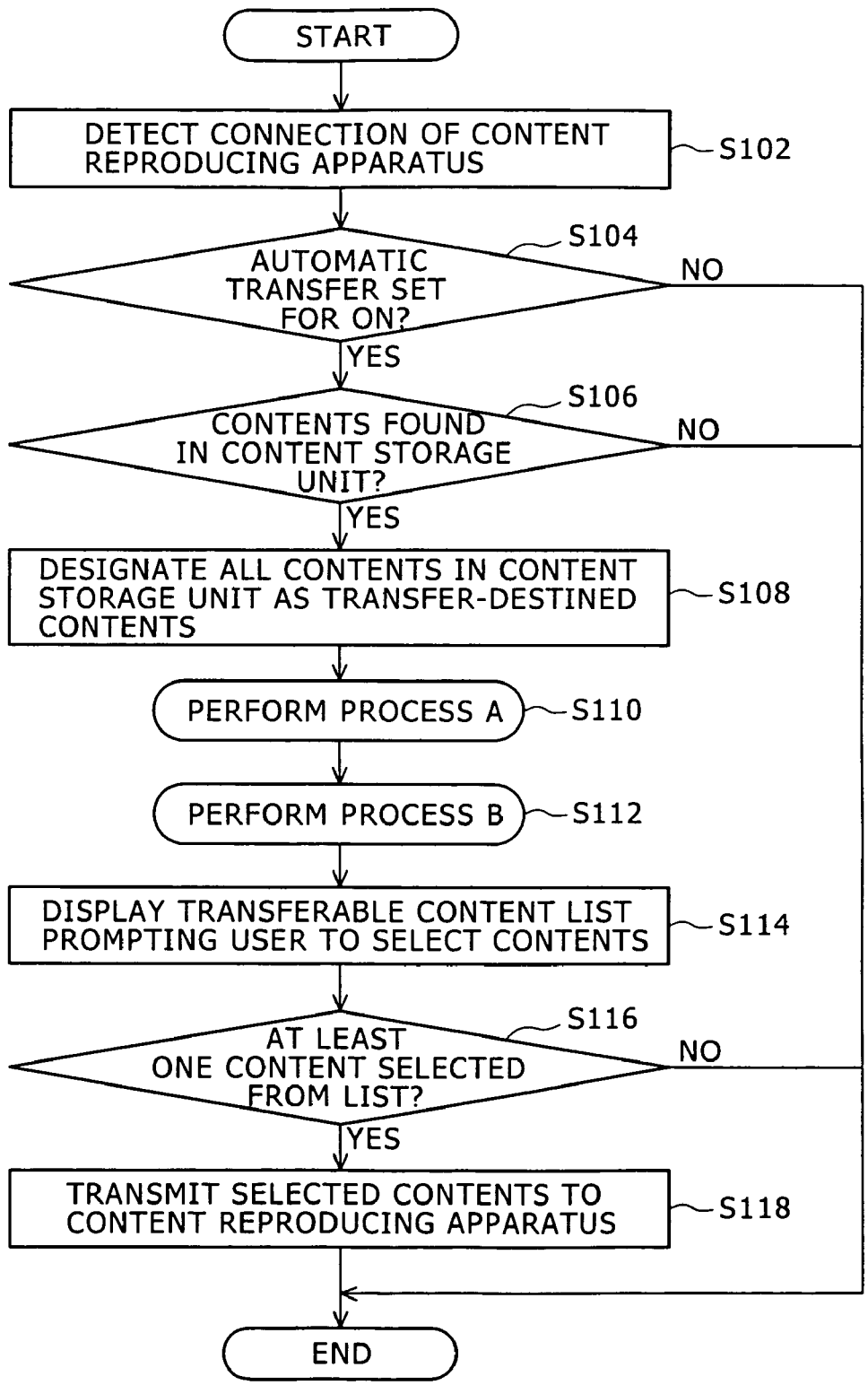
FIG. 9 is a flowchart of steps constituting a content transferring process carried out by the inventive system.
Figure 15:
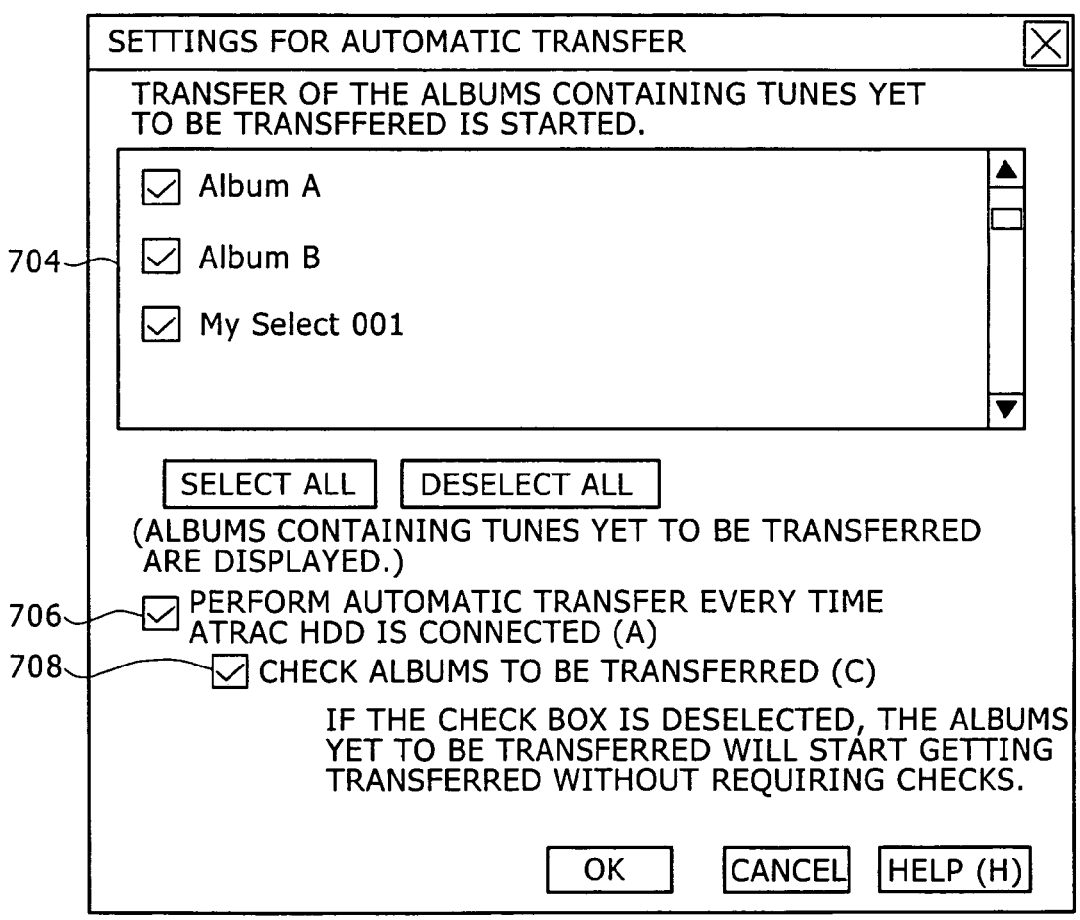
FIG. 15 is a schematic view of a screen layout showing an automatic transfer setting screen displayed on the content transferring apparatus in the inventive system.
Figure 16:
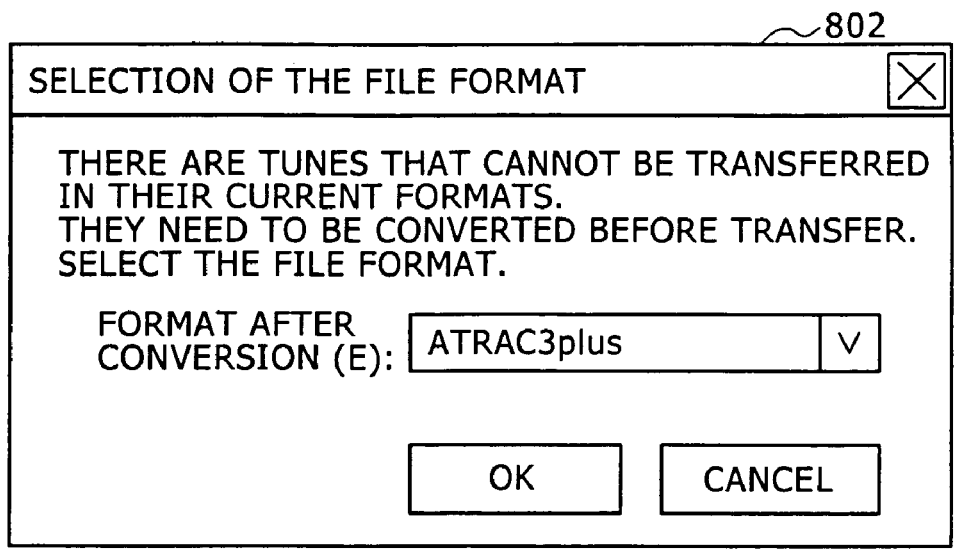
FIG. 16 is a schematic view of a screen layout showing a file format selection screen displayed on the content transferring apparatus in the inventive system.
Figure 17:
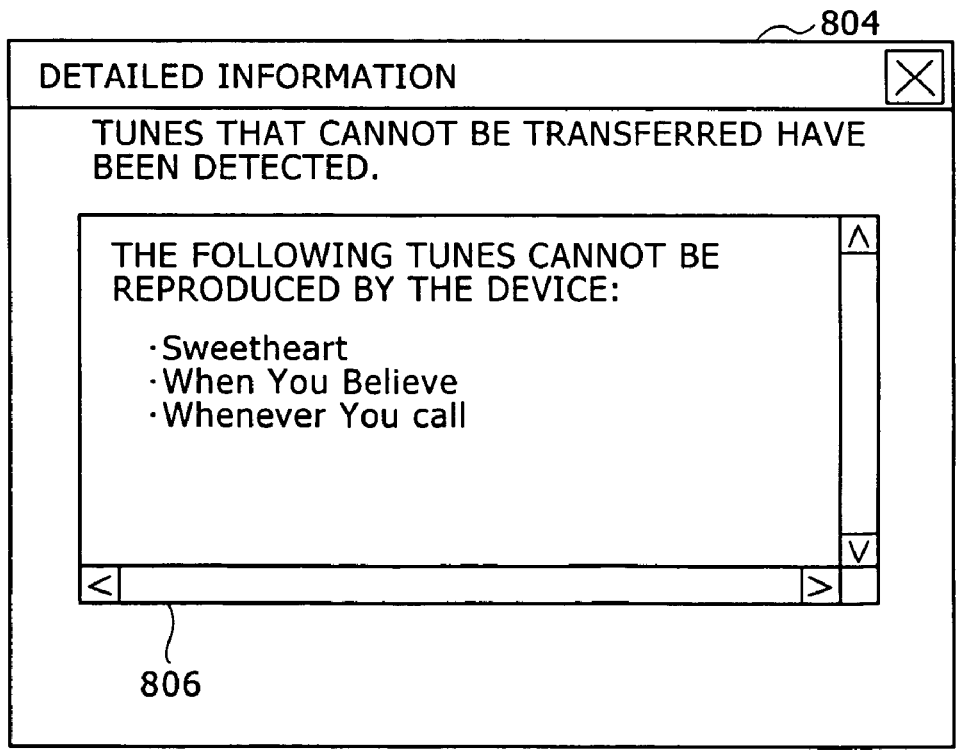
FIG. 17 is a schematic view of a screen layout showing a detailed information screen displayed on the content transferring apparatus in the inventive system.

In step S102 of FIG. 9, the content transferring apparatus 102 detects connection of the content reproducing apparatus 104. In step S104, the content transferring apparatus 102 terminates its processing if automatic transfer is not found set for ON. The setting for automatic transfer is made illustratively by the user through the GUI 224 in advance. FIG. 15 shows an example of a screen which is displayed to prompt a user to perform setting for automatic transfer. On the automatic transfer setting screen 702, the user may mark a setting checkbox 706 to turn on the automatic transfer setting. If a verification checkbox 708 is marked, the automatic transfer setting screen 702 appears before the content transfer takes place. The user is allowed to mark the names of desired albums in a transferable content list 704 on the automatic transfer setting screen 702 so that the contents of the selected albums may be transferred to the content reproducing apparatus 104. In this manner, the albums whose contents are desired to be transferred from the content transferring apparatus 102 to the content reproducing apparatus 104 can be verified or designated.

If in step S104 automatic transfer is found set for ON, the content transferring apparatus 102 goes to step S106 and checks to determine whether the content storage unit 220 retains at least one content. If no content is found in the content storage unit 220 in step S106, the content transferring apparatus 102 terminates its processing because there is no content to transfer. If any content is found in the content storage unit 220 in step S106, the content transferring apparatus 102 reaches step S108 and designates all contents as transfer-destined contents. Specifically, the content transferring apparatus 102 references the content management database 252 to designate the contents to be transferred using record IDs or other resources, as discussed above.

After executing a content extraction process A (in step S110) and a content extraction process B (in step S112), the content transferring apparatus 102 displays in step S114 a transferable content list showing album names including at east one transferable content. The displayed list prompts the user to select desired albums to be transferred. The processes A and B will be described later with reference to FIGS. 10 and 11 respectively, followed by a more detailed description of what takes place in step S114.

If no album is found selected from the transferable content list in step S116, then the content transferring apparatus 102 terminates its processing. If any album is found selected from the list, the content transferring apparatus 102 in step S118 transmits to the content reproducing apparatus 104 the content data making up transferable contents included in the selected album or albums (packages). The content transferring apparatus 102 transmits content data that is reproducible in terms of format by the content reproducing apparatus 104. Whether the content data to be transferred is in a format compatible with the content reproducing apparatus 104 may be determined by acquiring device information from that apparatus 104. Alternatively, a file format selection screen 802 shown in FIG. 16 may be arranged to appear on the display unit to let the user select an appropriate format. If the content transferring apparatus 102 does not keep its content data in any compatible format, then it may be necessary to convert the content data into a suitable format. A typical format conversion process will be discussed later with reference to FIG. 12.

Figure 10:
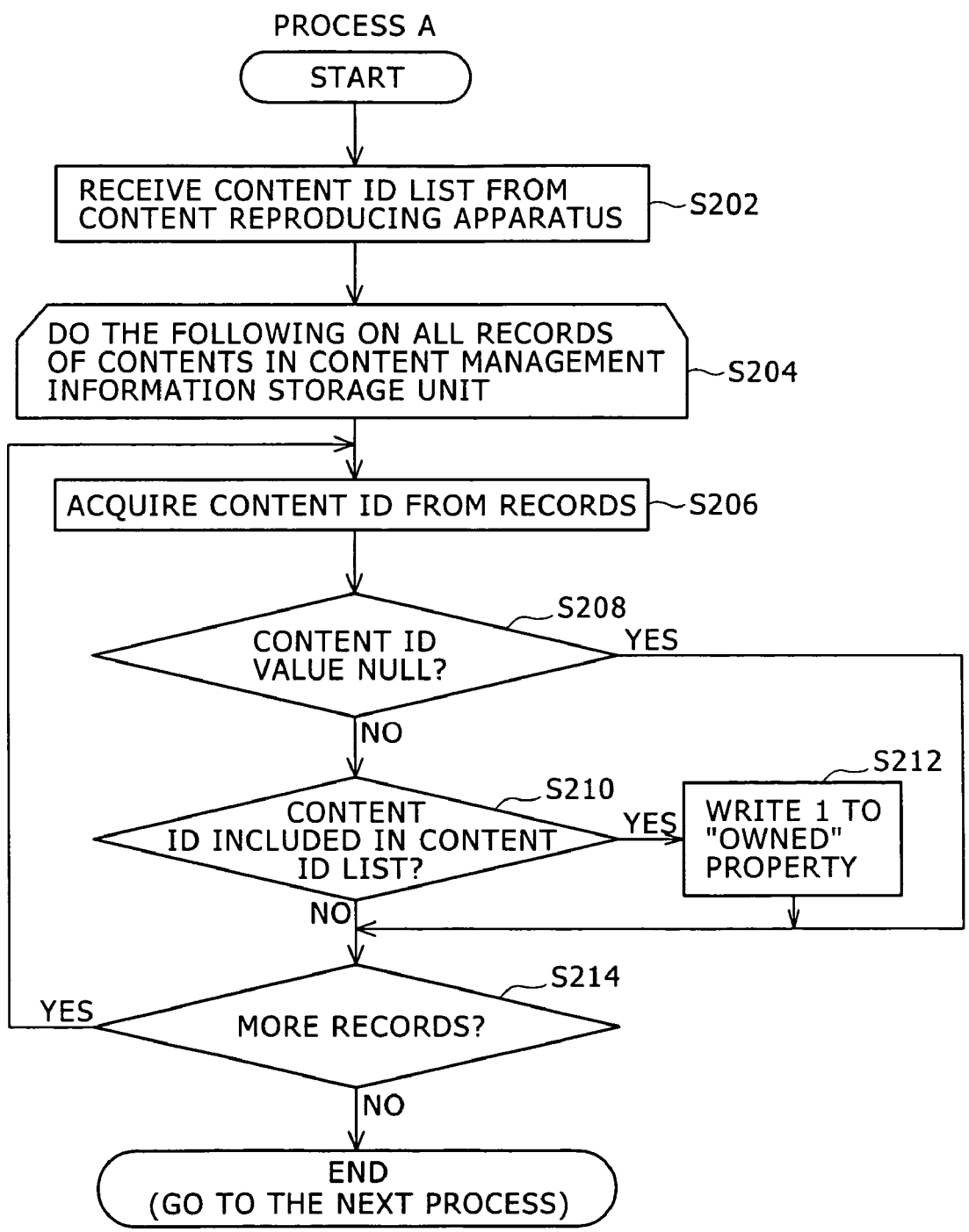
FIG. 10 is a flowchart of steps constituting a content extracting process carried out by the inventive system on the basis of content IDs.

The process A will now be described with reference to FIG. 10. In step S202, the content transferring apparatus 102 receives a content ID list from the connected content reproducing apparatus 104. Then the content transferring apparatus 102 performs a number of processes starting from step S204 on all records corresponding to the contents set in the type fields 304 of the content management database. Specifically, the content transferring apparatus 102 first acquires a content ID from each record in step S206.

In step S208, the content transferring apparatus 102 determines whether the acquired content ID is null. If the content ID is found to be null, that means the content ID field 312 for the record in question carries no value. That is, the content data managed with that record is not furnished with a content ID. If the content data is not provided with any content ID, the content data has yet to be subject to copyright management. The content data needs to carry a content ID so as to be subject to copyright management by the apparatus 102. Since it is assumed that the content reproducing apparatus 104 holds only the content data subject to copyright management, the apparatus 104 presumably does not own content data having no content ID. Therefore the content transferring apparatus 102 can appropriate the content data with no content ID for transfer-destined contents that have yet to be owned by the content reproducing apparatus 104. The null value may be any other value as long as it indicates that no content ID is found in the content ID field 312 of the record in question in the property table 252.

If in step S208 the corresponding content ID field is found to have a value other than null, step S210 is reached. In step S210, the content transferring apparatus 102 determines whether the content ID in question is included in the content ID list. If the content ID is not found to be included in the content ID list, the content transferring apparatus 102 appropriates the content data furnished with the content ID for transfer-destined content data yet to be owned by the content reproducing apparatus 104. If in step S210 the content ID is found to be included in the content ID list, the content transferring apparatus 102 writes "1" denoting an "owned" property to the source record corresponding to the content ID in question in the property table 252 in step S212. In other words, if the content ID is included in the content ID list, that means the content data furnished with the content ID is already owned by the content reproducing apparatus 104. Thus the value "1" is written to represent the content as an owned property which need not be transferred. A value of "0" is initially set to denote the owned property for each record in the property table 252.

The content transferring apparatus 102 verifies in step S214 that the above steps have been carried out on all records, before going to the next step. At this point following the content extraction process based on content IDs, the property table 252 of the content management database 222 has "1" set to denote the owned property for each record having a content ID included in the content ID list; the table 252 has "0" left unchanged as initialized to represent the owned property for all other records.

Figure 11:
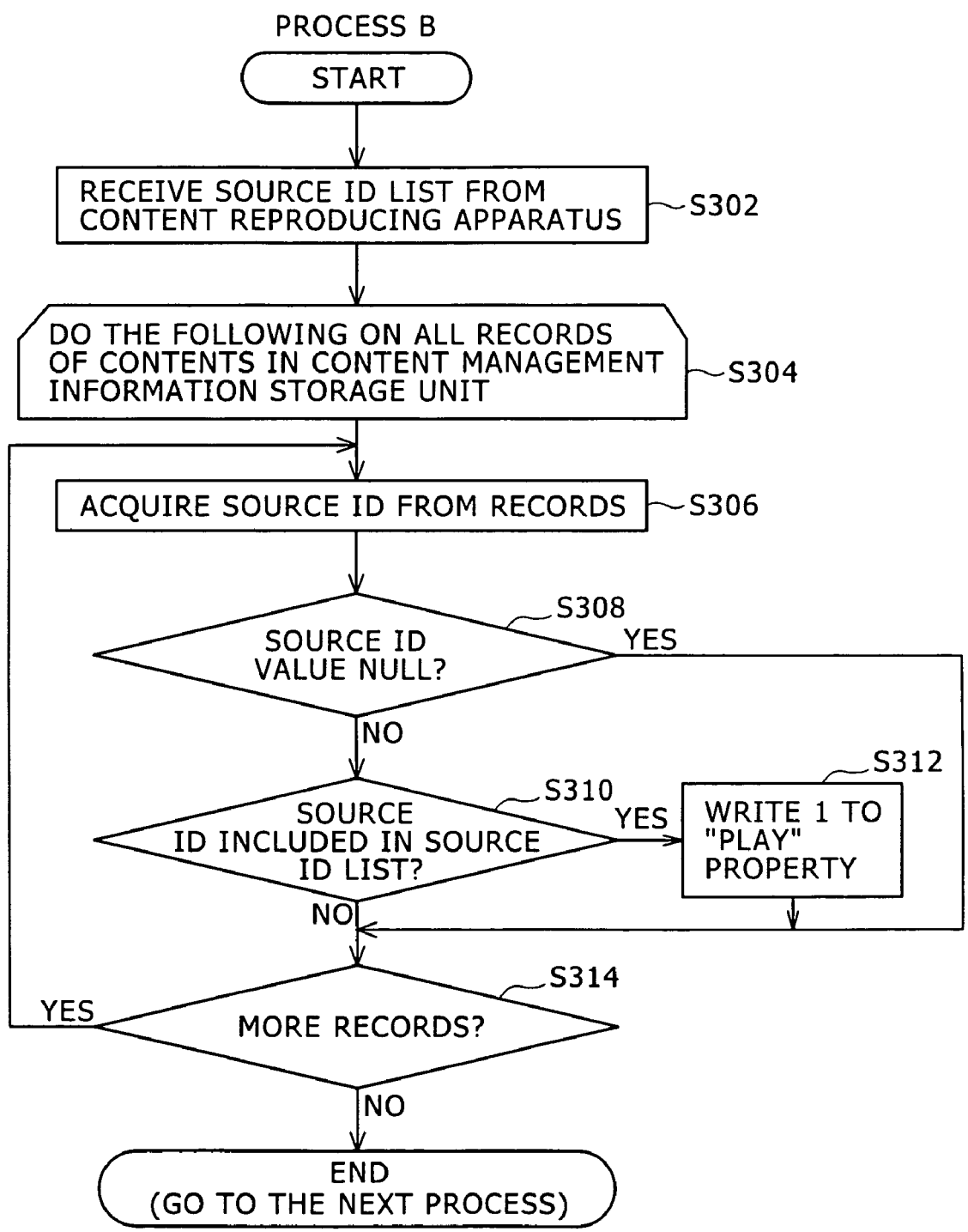
FIG. 11 is a flowchart of steps constituting another content extracting process carried out by the inventive on the basis of content IDs.

The process B will now be described by referring to FIG. 11. In step S302 of FIG. 11, the content transferring apparatus 102 receives a source ID list from the connected content reproducing apparatus 104. The content transferring apparatus 102 then performs a number of processes starting from step S304 on all records corresponding to the contents set in the type fields 304 of the content management database.

Specifically, the content transferring apparatus 102 first acquires a source ID from each record in step S306.

In step S308, the content transferring apparatus 102 determines whether the acquired source ID is null. If the source ID is found to be null, that means the source ID field 314 for the record in question carries no value. That is, the content data managed with that record is not furnished with a source ID. If the content data is not provided with any source ID, that means the content data has yet to be subject to copyright management. The content data needs to carry a source ID assigned to the content transferring apparatus 102 so that the content may be subject to copyright management. Since it is assumed that the content transferring apparatus 102 transfers contents only to the content reproducing apparatus 104 retaining a source ID list including the source ID assigned to the apparatus 102, the content reproducing apparatus 104 presumably can reproduce content data not furnished with the source ID. The assumption is that the content data with no source ID is furnished with the source ID of the content transferring apparatus 102 as described above and that the source ID list owned by the content reproducing apparatus 104 includes the source ID of the content transferring apparatus 102, as mentioned above. Therefore the content transferring apparatus 102 can appropriate the content data with no source ID for transfer-destined contents that can be reproduced by the content reproducing apparatus 104. The null value may be any other value as long as it indicates that no source ID is found in the source ID field 314 of the record in question in the property table 252.

If in step S308 the corresponding source ID field is found to have a value other than null, step S310 is reached. In step S310, the content transferring apparatus 102 determines whether the source ID in question is included in the source ID list. If the source ID is not found to be included in the source ID list in step S310, the content transferring apparatus 102 regards the content data furnished with the source ID as data not reproducible by the content reproducing apparatus 104 and thus removes the data from transfer-destined contents. If in step S310 the source ID is found to be included in the source ID list, the content transferring apparatus 102 writes "1" denoting a "play" property to the source record corresponding to the source ID in question in the property table 252 in step S312. In other words, if the source ID is included in the source ID list, that means the content data furnished with the source ID can be reproduced by the content reproducing apparatus 104. Thus the value "1" is written to represent the content as a transfer-destined content. A value of "0" is initially set to denote the play property for each record in the property table 252.

The content transferring apparatus 102 verifies in step S314 that the above steps have been carried out on all records, before going to the next step. By this time, the property table 252 of the content management database 222 had "1" or "0" set to denote the owned property for each record following the process A above. At present, if the source ID is included in the source ID list, the property table 252 additionally has "1" set to denote the play property for each record having a source ID included in the source ID list; the table 252 has "0" left unchanged as initialized to represent the play property for all other records.

The process of step S114 in FIG. 9 will now be described. From the property table of the above-described state, the content transferring apparatus 102 acquires the record ID of each record with "0" set for the owned property and "1" for the play property. That is, the content transferring apparatus 102 acquires the record ID of each record which has a content ID not included in the content ID list and which has a source ID included in the source ID list. With the record ID acquired, the content transferring apparatus 102 references the parent-child relation table 254 to search for a parent ID having the record ID in question as a child ID. With the parent ID thus obtained, it is possible to acquire the record ID of the package. After obtaining the record ID of the package, the content transferring apparatus 102 reads an album name and other information from the record and displays what has been read as a transferable content list.

FIGS. 13A through 13C show examples of transferable and nontransferable albums distinguished by their "owned" and "play" properties. All records of the contents included in an album 402 shown in FIG. 13A are set to "0" for their owned property 316 and play property 318. This indicates that all contents are not owned by the content reproducing apparatus 104 and that they cannot be reproduced thereby even if transferred thereto. Because the album 402 does not include any transferable content, the transferable content list does not display any information about the album 402.

All records of the contents included in an album 404 shown in FIG. 13B are set to "1" for their owned property 316 and play property 318. This indicates that all contents are reproducible by the content reproducing apparatus 104 and that they are already owned thereby. Because the album 404 does not include any transferable content, the transferable content list dos not display any information about the album 404.

The records of the contents included in an album 406 shown in FIG. 13C are all set to "1" for their play property while a record ID14 and a record ID15 are set to "0" for their owned property. This indicates that all contents are reproducible by the content reproducing apparatus 104 and that the contents of the record ID14 and record ID15 are not owned thereby. Because the album 406 includes two transferable contents, the transferable content list displays information about the album 406. As described above, the content transferring apparatus 102 displays the names of only the albums that include transferable contents in the transferable content list 704 shown in FIG. 15. The user finds it more efficient to select desired albums or contents for transfer based on the above-described list than if presented with the names of all albums regardless of their contents being transferable or non-transferable.

Figure 12:
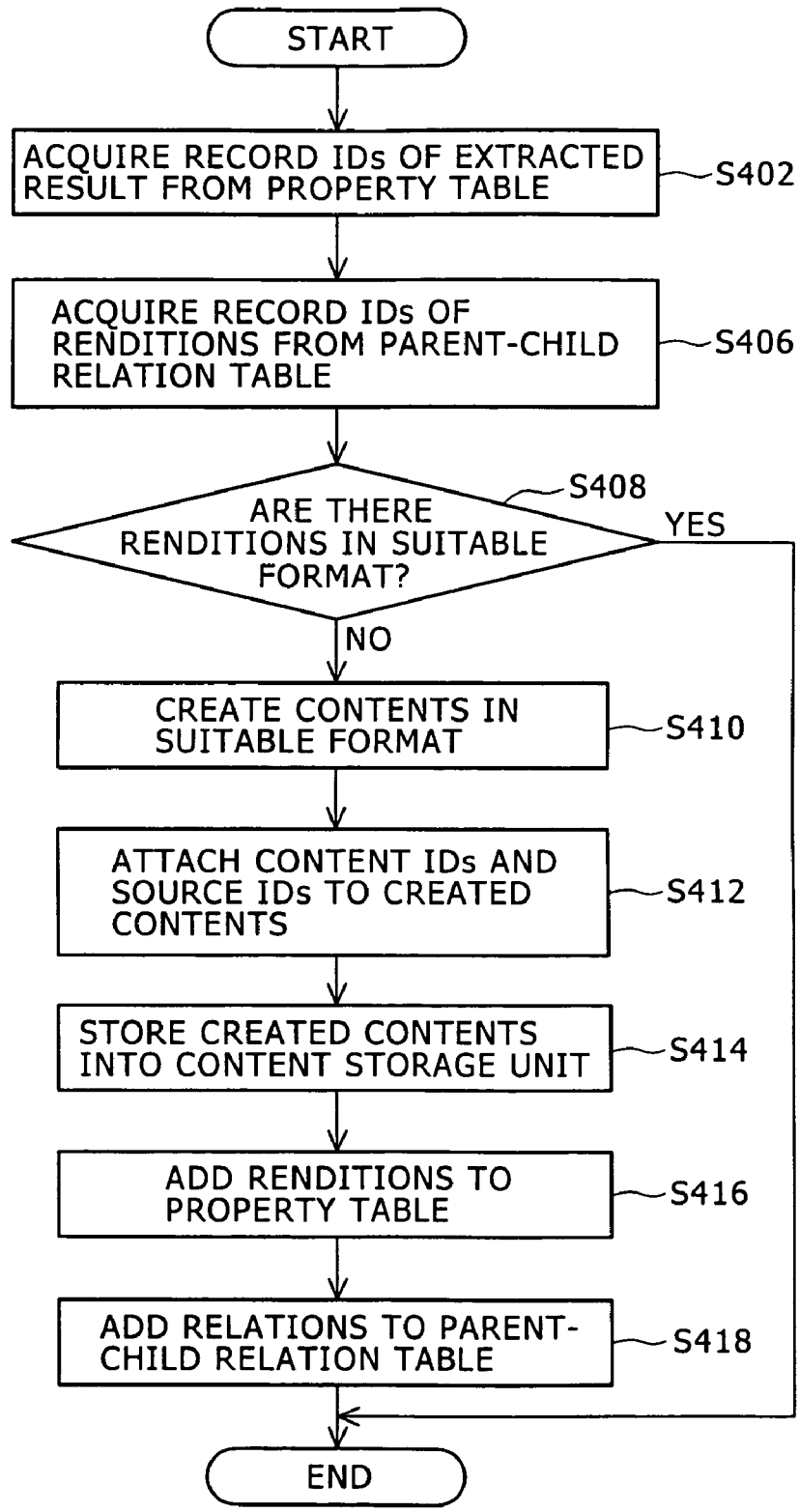
FIG. 12 is a flowchart of steps constituting a format converting process performed on contents by the inventive system.

How the format conversion process typically takes place will now be described with reference to FIG. 12. In step S402, the content transferring apparatus 102 acquires from the property table 252 the record IDs extracted by the processes A and B described above. The type fields 402 corresponding to these record IDs carry contents. With the record IDs acquired, the content transferring apparatus 102 in step S406 acquires all record IDs related to these record IDs as child IDs from the parent-child relation table 254. The type fields 304 of the acquired record IDs carry renditions. The content transferring apparatus 102 acquires the codec type and file name (file format) for each of the records corresponding to the acquired record IDs. In step S408, the content transferring apparatus 102 determines whether there exist renditions having any codec type and file name suitable for transfer to the content reproducing apparatus 104. If the suitable renditions are detected in step S408, the content transferring apparatus 102 retrieves from the content storage unit 220 the content data corresponding to these renditions and sends the retrieved content data to the content reproducing apparatus 104. In this case, there is no need for the conversion process.

If in step S408 no renditions are detected which have any codec type or file name suitable for transfer to the content reproducing apparatus 104, the content transferring apparatus 102 goes to step S410. In step S410, the content transferring apparatus 102 creates content data using a codec type and a file format suitable for the transfer. In step S412, the content transferring apparatus 102 furnishes the created content data with content IDs and source IDs. In step S414, the content transferring apparatus 102 stores the ID-furnished content data into the content storage unit 220. In step S416, the content transferring apparatus 102 adds the renditions corresponding to the stored content data to the property table 252. In step S418, the content transferring apparatus 102 adds the relations between the renditions and the contents to the parent-child relation table 254.

How the content transferring apparatus 102 performs automatic transfer has been discussed above. The same extraction and transmission processes as described above apply not only to suitable albums for automatic transfer but also to the albums or contents designated manually by the user as transfer-destined contents on the above-mentioned initial screen 602. In the latter case, there may exist contents which were designated by the user but which turned out to be nontransferable and thus have not been transferred to the content reproducing apparatus 104. In this situation, the content transferring apparatus 102 should preferably give a detailed information screen 804 shown in FIG. 17 on its display unit so as to present the user with a nontransferable content list 806 indicating the contents that have not been transferred.

The flows of the content transfer processing carried out by the content transferring apparatus 102 have been discussed above. The content transferring apparatus 102 is structured as described in order to transfer only the content data reproducible by the content reproducing apparatus 104. This structure prevents situations where not only reproducible content but also those not reproduced by the content reproducing apparatus 104 are transferred so that the capacity of the storage unit in the apparatus 104 is wasted. Because the content transferring apparatus 102 does not transfer any content data not reproducible by the content reproducing apparatus 104, the time required for data transfer is appreciably shortened.

It is to be understood that while invention has been described in conjunction with a specific embodiment with reference to the accompanying drawings, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

For example, the content transferring apparatus 102 was shown to determine whether or not given content data is reproducible by the content reproducing apparatus 104 under copyright on the basis of the source ID attached to the content data in question and the source ID list obtained from the content reproducing apparatus 104. Alternatively, if the content data of interest is subject to a limited reproducible period or to a limited number of times the data can be reproduced, then the content transferring apparatus 102 may take these restrictions into account before transmitting reproducible content data to the content reproducing apparatus 104. More specifically, constraints such as content data reproducible periods and content reproducible counts may be stored in the content management database 222 or in some other suitable database in association with content IDs. In operation, the content transferring apparatus 102 of the above-described embodiment may get the first extraction unit 212 and second extraction unit 214 to extract transferable contents. The content transferring apparatus 102 may then refer to the constraints associated with the content IDs of the contents in question, thereby extracting reproducible contents whose reproducible periods or reproducible counts have yet to expire or be exhausted. This preferred structure thus provides a content transferring apparatus capable of transferring contents by taking into consideration not only their source IDs but also any relevant constraints applicable to the contents under copyright.

Thus the present invention can be applied to a content transferring apparatus for transferring contents to a content reproducing apparatus such as a portable device. In particular, this invention can be applied to a content transferring apparatus for automatically transferring a plurality of contents to the content reproducing apparatus.

What is claimed is:

1. A content transferring apparatus comprising:
    a storage unit configured to store a plurality of transfer-destined contents;
    an identification list reception unit configured to receive an identification list from a content reproducing apparatus, the identification list including identification information of at least one specific providing device, wherein the content reproducing apparatus is permitted to reproduce contents furnished with identification information included in said identification list, the identification information furnished with a respective content corresponding to a specific providing device which initially recorded the respective content and the content reproducing apparatus being prohibited from reproducing a content that is not furnished with identification information included on the identification list;
    a first extraction unit configured to extract, from the plurality of transfer-destined contents, a content furnished with identification information included in said identification list, and to not extract a content that is not furnished with identification information included in the identification list; and
    a content ID list reception unit configured to receive from said content reproducing apparatus a content ID list including content IDs identifying contents already stored on said content reproducing apparatus; and
    a second extraction unit for extracting, from the plurality of transfer-destined contents, content furnished with a content ID not included in said content ID list;
    a content transmission unit configured to transmit content extracted by both the first extraction unit and the second extraction units to said content reproducing apparatus.

2. A content transferring apparatus according to claim 1, wherein said first extraction unit extracts the contents furnished with identification information included in said identification list from the contents extracted by said second extraction unit.

3. A content transferring apparatus according to claim 1, further comprising:
    an outgoing content acquisition unit configured to determine a format of contents extracted by said first extraction unit and identify whether the format is not reproducible by said content reproducing apparatus; and
    a format conversion unit which is configured, when the outgoing content acquisition unit determines that the contents extracted by said first extraction unit are in a format not reproducible by said content reproducing apparatus, to convert said extracted contents into a format reproducible by said content reproducing apparatus;
    wherein said content transmission unit transmits the newly formatted contents to said content reproducing apparatus.

4. A content reproducing apparatus according to claim 3, wherein said newly formatted contents are stored into a content storage unit in association with the previously formatted contents.

5. A content transferring apparatus according to claim 1, further comprising:
   a content storage unit configured to store a plurality of contents; and
   a transfer-destined content designation unit configured to designate either one or a plurality of contents as said transfer-destined contents from among said plurality of contents stored in said content storage unit.

6. A content transferring apparatus according to claim 5, wherein said transfer-destined content designation unit designates in a suitably timed manner all contents stored in said content storage unit as said transfer-destined contents.

7. A content transferring apparatus according to claim 5, wherein said transfer-destined content designation unit designates user-designated contents as said transfer-destined contents to be transferred from said content storage unit.

8. A content transferring apparatus according to claim 5, further comprising:
   a nontransferable content list display unit configured to display a nontransferable content list of the contents which are designated as said transfer-destined contents by said transfer-destined content designation unit and which have not been extracted by said first extraction unit.

9. A content transferring apparatus according to claim 5, wherein said content storage unit stores said plurality of contents in either one or a plurality of groups, said content transferring apparatus further comprising:
   a transferable content list display unit configured to display a transferable content list of at least one of said groups including at least one content extracted by said first extraction unit.

10. A content transferring apparatus according to claim 1, further comprising:
    a transferable content list display unit configured to display a transferable content list of the contents extracted by said first extraction unit.

11. A Non-Transitory computer readable storage medium encoded with computer executable instructions, which when executed by a content transferring apparatus,
    cause the content transferring apparatus to perform a procedure comprising:
    storing a plurality of transfer-destined contents; receiving an identification list from a content reproducing apparatus, the identification list including identification information of at least one specific providing device, wherein the content reproducing apparatus is permitted to reproduce contents furnished with identification information included in said identification list, an identification information furnished with a respective content corresponding to a specific providing device which initially recorded the respective content and the content reproducing apparatus being prohibited from reproducing a content that is not furnished with identification information included on the identification list;
    first extracting, from the plurality of transfer-destined contents, a content furnished with identification information included in said identification list, and not extracting a content that is not furnished with identification information included in the identification list; and
    receiving from said content reproducing apparatus a content ID list including content IDs identifying contents already stored on said content reproducing apparatus; and
    second extracting, from the plurality of transfer-destined contents, a content furnished with a content ID not included in said content ID list; and
    transmitting content extracted in both said first and said second extracting steps to said content reproducing apparatus.

12. A Non-Transitory computer readable storage medium according to claim 11, wherein said first extracting step extracts the contents furnished with identification information included in said identification list from the contents extracted in said second extracting step.

13. A Non-Transitory computer readable storage medium according to claim 11, wherein said procedure further comprises the step of, determining a format of contents extracted in said first extracting step and identifying whether the format is not reproducible by said content reproducing apparatus, and when the contents extracted by said first extraction unit are in a format not reproducible by said content reproducing apparatus, then converting said extracted contents into a format reproducible by said content reproducing apparatus; and
    wherein said content transmitting step transmits the newly formatted contents to said content reproducing apparatus.

14. A Non-Transitory computer readable storage medium according to claim 13, wherein said procedure further comprises the step of storing said newly formatted contents into a content storage unit in association with the previously formatted contents.

15. A Non-Transitory computer readable storage medium according to claim 11, wherein said procedure further comprises the step of designating either one or a plurality of contents as said transfer-destined contents from among said plurality of contents stored in a content storage unit storing a plurality of contents.

16. A Non-Transitory computer readable storage medium according to claim 15, wherein said transfer-destined content designating step designates in a suitably timed manner all contents stored in said content storage unit as said transfer-destined contents.

17. A Non-Transitory computer readable storage medium according to claim 15, wherein said transfer-destined content designating step designates user-designated contents as said transfer-destined contents to be transferred from said content storage unit.

18. A Non-Transitory computer readable storage medium according to claim 15, wherein said procedure further comprises the step of displaying a nontransferable content list of the contents which are designated as said transfer-destined contents in said transfer-destined content designating step and which have not been extracted in said first extracting step.

19. A Non-Transitory computer readable storage medium according to claim 15, wherein said content storage unit stores said plurality of contents in either one or a plurality of groups; and
    wherein said procedure further comprises the step of displaying a transferable content list of at least one of said groups including at least one content extracted in said first extracting step.

20. A Non-Transitory computer readable storage medium according to claim 11, wherein said procedure further comprises the step of displaying a transferable content list of the contents extracted in said first extracting step.

21. A content transferring method, implemented on a content transferring apparatus, comprising the steps of:

storing, at the content transferring apparatus, a plurality of transfer-destined contents;

receiving, at the content transferring apparatus, an identification list from a content reproducing apparatus, the identification list including identification information of at least one specific providing device, wherein the content reproducing apparatus is permitted to reproduce contents furnished with identification information included in said identification list, an identification information furnished with a respective content corresponding to a specific providing device which initially recorded the respective content and the content reproducing apparatus being prohibited from reproducing a content that is not furnished with identification information included on the identification list;

first extracting, at the content transferring apparatus, from the plurality of transfer-destined contents, a content furnished with identification information included in said identification list, and not extracting a content that is not furnished with identification information included in the identification list; and receiving, at the content transferring apparatus, from said content reproducing apparatus a content ID list including content IDs identifying contents already stored on said content reproducing apparatus; and second extracting, at the content transferring apparatus, from the plurality of transfer-destined contents, a content furnished with a content ID not included in said content ID list; and transmitting, at the content transferring apparatus, content extracted in both said first and said second extracting steps to said content reproducing apparatus.

* * * * *